United States Patent
Jia et al.

(10) Patent No.: US 10,148,465 B2
(45) Date of Patent: Dec. 4, 2018

(54) TRAINING ASSISTED JOINT EQUALIZATION

(71) Applicant: ZTE Corporation, Shenzhen (CN)

(72) Inventors: Zhensheng Jia, Louisville, CO (US); Hung-Chang Chien, Bridgewater, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/530,179

(22) Filed: Dec. 8, 2016

(65) Prior Publication Data

US 2017/0170993 A1   Jun. 15, 2017

Related U.S. Application Data

(60) Provisional application No. 62/264,626, filed on Dec. 8, 2015.

(51) Int. Cl.
*H04B 10/00*  (2013.01)
*H04L 25/03*  (2006.01)

(52) U.S. Cl.
CPC .. *H04L 25/03006* (2013.01); *H04L 25/03343* (2013.01); *H04L 2025/03815* (2013.01)

(58) Field of Classification Search
CPC . H04B 3/32; H04B 3/23; H04B 10/58; H04B 10/505; H04B 10/2507; H04B 10/504; H04B 10/25137; H04B 2210/254; H04B 10/564; H04B 10/50; H04L 25/03343; H04L 25/497; H04L 25/03057; G02F 2203/19; H01S 5/0683

USPC ........ 398/136–172, 182–201; 375/219–221, 375/229–236, 260–285, 295–296
See application file for complete search history.

(56) References Cited

U.S. PATENT DOCUMENTS

| | | | | |
|---|---|---|---|---|
| 3,845,390 A | * | 10/1974 | De Jager | H03H 21/0012 375/231 |
| 4,995,057 A | * | 2/1991 | Chung | H04L 25/03044 333/18 |
| 5,161,044 A | * | 11/1992 | Nazarathy | H04B 1/62 398/194 |
| 5,321,725 A | * | 6/1994 | Paik | H04L 1/0057 348/155 |

(Continued)

OTHER PUBLICATIONS

Buchali, F., et al., "Implementation of 64QAM at 42.66 GBaud Using 1.5 Samples per Symbol DAC and Demonstration of up to 300 km Fiber Transmission," Optical Fiber Communication Conference, OSA Technical Digest (online) (Optical Society of America, 2014), San Francisco, California USA, Paper M2A.1, pp. 1-3, Mar. 2014.

(Continued)

*Primary Examiner* — James M Perez
(74) *Attorney, Agent, or Firm* — Perkins Coie LLP

(57) ABSTRACT

Throughput between a transmitter and a receiver is increased by performing a three-stage joint channel optimization in which training sequences are used for calculating a pre-equalization estimate in the first stage, a look up table for pre-distortion in the second stage and a further updating the pre-equalization estimate and the look up table based on a third stage in which the training sequence used for the updating is pre-equalized and pre-distorted using previously calculated values prior to transmitting from the transmitter to the receiver.

29 Claims, 19 Drawing Sheets

(56) References Cited

U.S. PATENT DOCUMENTS

| | | | | |
|---|---|---|---|---|
| 5,361,156 A * | 11/1994 | Pidgeon | H04B 10/2507 | 398/193 |
| 5,424,680 A * | 6/1995 | Nazarathy | H03F 1/3252 | 327/133 |
| 6,016,374 A * | 1/2000 | Adams | H04B 10/2513 | 385/24 |
| 6,144,711 A * | 11/2000 | Raleigh | H04B 7/0615 | 375/346 |
| 6,285,859 B1 * | 9/2001 | Fernandez Duran | H04L 5/14 | 375/296 |
| 6,516,025 B1 * | 2/2003 | Warke | H04L 25/03343 | 375/220 |
| 6,687,466 B1 * | 2/2004 | Chiappetta | H04B 10/504 | 330/149 |
| 6,889,060 B2 * | 5/2005 | Fernando | H04B 10/25754 | 375/229 |
| 6,961,314 B1 * | 11/2005 | Quigley | H04J 3/0682 | 370/252 |
| 7,062,177 B1 * | 6/2006 | Grivna | H04B 10/2581 | 398/16 |
| 7,082,253 B2 * | 7/2006 | Dominic | B82Y 20/00 | 385/147 |
| 7,092,638 B2 * | 8/2006 | Funami | H04J 14/0221 | 398/140 |
| 7,209,664 B1 * | 4/2007 | McNicol | H04B 10/50 | 375/219 |
| 7,317,769 B2 * | 1/2008 | Tonietto | G11B 20/10009 | 342/151 |
| 7,321,612 B2 * | 1/2008 | Tonietto | G11B 20/10009 | 342/151 |
| 7,426,350 B1 * | 9/2008 | Sun | H04B 10/25137 | 398/159 |
| 7,542,685 B2 * | 6/2009 | Bai | H04B 10/0775 | 398/147 |
| 7,587,143 B2 * | 9/2009 | Sinha | H04B 10/25137 | 398/159 |
| 7,664,171 B2 * | 2/2010 | Sun | H04L 25/03057 | 329/316 |
| 7,684,710 B2 * | 3/2010 | Giaretta | H04B 10/43 | 398/135 |
| 7,835,387 B2 * | 11/2010 | Agazzi | H03M 1/0624 | 370/290 |
| 8,041,226 B2 * | 10/2011 | Kato | H04B 10/40 | 375/232 |
| 8,041,233 B2 * | 10/2011 | Hueda | H04B 10/60 | 398/140 |
| 8,285,148 B2 * | 10/2012 | Haunstein | H04B 10/60 | 398/158 |
| 8,295,713 B2 * | 10/2012 | Cai | H04B 10/61 | 398/154 |
| 8,379,709 B2 * | 2/2013 | Hui | H04L 25/0228 | 375/232 |
| 8,666,257 B2 * | 3/2014 | Daghighian | H04B 10/40 | 398/130 |
| 8,693,867 B2 * | 4/2014 | Littler | H01S 5/0687 | 372/29.02 |
| 8,737,840 B2 * | 5/2014 | Nakamoto | H04B 10/2572 | 398/140 |
| 8,891,347 B2 * | 11/2014 | Yin | H04L 27/01 | 370/203 |
| 9,137,063 B2 * | 9/2015 | Zerbe | H04L 1/0026 | |
| 9,698,914 B2 * | 7/2017 | Yu | H04L 25/0305 | |
| 9,900,189 B2 * | 2/2018 | Zerbe | H04L 25/0307 | |
| 9,912,500 B2 * | 3/2018 | Yu | H04B 10/0799 | |
| 2002/0196844 A1 * | 12/2002 | Rafie | H04L 25/03038 | 375/232 |
| 2003/0072382 A1 * | 4/2003 | Raleigh | H04B 7/0615 | 375/267 |
| 2003/0081670 A1 * | 5/2003 | Bologna | H04L 25/03044 | 375/234 |
| 2006/0127102 A1 * | 6/2006 | Roberts | H04B 10/505 | 398/182 |
| 2007/0147489 A1 * | 6/2007 | Sun | H04L 25/03057 | 375/231 |
| 2007/0297803 A1 * | 12/2007 | Peral | H03F 1/32 | 398/140 |
| 2009/0074419 A1 * | 3/2009 | Pappert | H04B 10/25137 | 398/91 |
| 2009/0245448 A1 * | 10/2009 | Ran | H04L 7/0004 | 375/373 |
| 2010/0046600 A1 * | 2/2010 | Zerbe | H04L 25/0307 | 375/233 |
| 2013/0209089 A1 * | 8/2013 | Harley | H04B 10/5561 | 398/25 |
| 2013/0272698 A1 * | 10/2013 | Jin | H04L 27/2628 | 398/43 |
| 2013/0336139 A1 * | 12/2013 | Phan Huy | H04L 25/03343 | 370/252 |
| 2014/0072307 A1 * | 3/2014 | Zamani | H04B 10/616 | 398/79 |
| 2014/0098844 A1 * | 4/2014 | Mobin | H04B 1/40 | 375/219 |
| 2014/0199073 A1 * | 7/2014 | Yu | H04L 5/0048 | 398/76 |
| 2014/0328588 A1 * | 11/2014 | Sakai | H04B 10/63 | 398/38 |
| 2015/0222360 A1 * | 8/2015 | Boertjes | H04B 10/25073 | 398/141 |
| 2016/0028577 A1 * | 1/2016 | Yu | H04L 27/2659 | 398/76 |
| 2016/0065311 A1 * | 3/2016 | Winzer | H04B 10/2504 | 398/193 |
| 2016/0080091 A1 * | 3/2016 | Thesling | H04B 10/60 | 398/188 |
| 2016/0105297 A1 * | 4/2016 | Yaman | H04L 25/03859 | 398/159 |
| 2016/0164703 A1 * | 6/2016 | Stone | H04L 25/03057 | 398/140 |
| 2016/0248540 A1 * | 8/2016 | Yu | H04J 11/00 | |
| 2016/0285657 A1 * | 9/2016 | Yu | H04B 10/0799 | |
| 2017/0163350 A1 * | 6/2017 | Chien | H04B 10/6162 | |
| 2017/0180055 A1 * | 6/2017 | Yu | H04B 10/612 | |
| 2017/0317759 A1 * | 11/2017 | Agazzi | H04B 10/40 | |

OTHER PUBLICATIONS

Chien, H.-C., et al., "256-Gb/s Single-Carrier PM-256QAM Implementation Using Coordinated DD-LMS and CMA Equalization," 2015 European Conference on Optical Communication (ECOC), Valencia, Spain, Mo.3.3.2, pp. 1-3, Sep. 2015.

Fludger, C.R.S., "Digital Signal Processing for Coherent Transceivers in Next Generation Optical Networks," 2014 European Conference on Optical Communication (ECOC), Cannes, France, Tu.3.1.1, pp. 1-3, Nov. 2014.

Geyer, J., et al., "Practical Implementation of Higher Order Modulation Beyond 16-QAM," Optical Fiber Communication Conference, OSA Technical Digest (online) (Optical Society of America, 2015), Los Angeles, California USA, Paper Th1B.1, pp. 1-3, Mar. 2015.

Jia, Z., et al., "Performance Analysis of Pre- and Post-Compensation for Bandwidth-Constrained Signal in High-Spectral-Efficiency Optical Coherent Systems," Optical Fiber Communication Conference, OSA Technical Digest (online) (Optical Society of America, 2014), San Francisco, California USA, Paper W3K.3, pp. 1-3, Mar. 2014.

Jia, Z., et al., "Performance Comparison of Dual-Carrier 400G with 8/16/32-QAM Modulation Formats," IEEE Photonics Technology Letters, 27(13):1414-1417, Jul. 2015.

Ke, J., et al., "400 Gbit/s single-carrier and 1 Tbit/s three-carrier superchannel signals using dual polarization 16-QAM with look-up table correction and optical pulse shaping," Optics Express, 22(1):71-83, Jan. 2014.

O'Sullivan, M., et al., "A 400G/1T High Spectral Efficiency Technology and Some Enabling Subsystems," Optical Fiber Communication Conference, OSA Technical Digest (online) (Optical Society of America, 2012), Los Angeles, California USA, Paper OM2H.1, pp. 1-3, Mar. 2012.

(56) References Cited

OTHER PUBLICATIONS

Zhang, J., et al., "Transmission of single-carrier 400G signals (515.2-Gb/s) based on 128.8-GBaud PDM QPSK over 10,130- and 6,078 km terrestrial fiber links," Optics Express, 23(13):16540-16545, Jun. 2015.

Zhang, S., et al., "Trans-Pacific Transmission of Quad-Carrier 1Tb/s DP-8QAM Assisted by LUT-based MAP Algorithm," Optical Fiber Communication Conference, OSA Technical Digest (online) (Optical Society of America, 2015), Los Angeles, California USA, Paper W3G.3, pp. 1-3, Mar. 2015.

Zhou, X., et aL, "1200km Transmission of 50GHz spaced, 5x504-Gb/s PDM-32-64 hybrid QAM using Electrical and Optical Spectral Shaping," Optical Fiber Communication Conference, OSA Technical Digest (online) (Optical Society o America, 2012), Los Angeles, California USA, Paper 0M2A.2, pp. 1-3, Mar. 2012.

* cited by examiner

TRAINING ASSISTED JOINT EQUALIZATION

CROSS REFERENCE TO RELATED APPLICATIONS

This patent document claims the benefit of priority of U.S. Provisional Patent Application No. 62/264,626, filed on Dec. 8, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses techniques for compensating linear and nonlinear impairments in digital communication transmission and reception devices.

In one example aspect, a method of optical communication, implemented at a receiver in an optical communication network is disclosed. The method includes enabling data communication with a transmitter using a jointly equalized signal using three stages of optimization comprising a pre-equalization stage followed by a pre-distortion stage followed by a joint equalization stage. The pre-equalization stage includes receiving, over an optical channel, an optical signal carrying a first training sequence of symbols, wherein the first training sequence is known a priori to the receiver, processing the optical signal to estimate inverse channel response and communicating the inverse channel response to a transmitter. The pre-distortion stage includes further receiving a second training sequence that is pre-equalized using the inverse. channel response, generating pre-distortion information from the received second training sequence, and transmitting the pre-distortion information to the transmitter. The joint equalization stage includes receiving a third training sequence that is pre-equalized using the inverse channel response and pre-distorted using the pre-distortion information, selectively updating, based on a possible improvement, the inverse channel response and the pre-distortion information from the received third training sequence, and communicating, when updated, the inverse channel response and the pre-distortion information to the transmitter.

In yet another aspect, a method of optical communication, implemented at a transmitter in an optical communication network, is disclosed. The method comprises enabling data communication with a receiver using a jointly equalized signal using three stages of optimization comprising a pre-equalization stage followed by a pre-distortion stage followed by a joint equalization stage The pre-equalization stage includes: transmitting, over an optical channel, an optical signal carrying a first training sequence of symbols, receiving an estimate of inverse channel response, and storing the estimate of the inverse channel response at the transmitter. The pre-distortion stage includes pre-equalizing and transmitting a second training sequence using the estimate of the inverse channel response, receiving pre-distortion information generated based on the second training sequence, and storing the pre-distortion information at the transmitter. The joint equalization stage includes jointly performing pre-distortion and pre-equalization of a third training sequence using the estimate of the inverse channel response and the pre-distortion information to generate a pre-distorted and pre-equalized third training sequence, transmitting the pre-distorted and pre-equalized third training sequence over the optical channel, and receiving, based on the pre-distorted and pre-equalized third training sequence, updating information for updating the estimate of the inverse channel response and the pre-distortion information stored at the transmitter.

These and other aspects, and their implementations and variations are set forth in the drawings, the description and the claims.

DETAILED DESCRIPTION

In this patent document, the word "exemplary" is used to mean serving as an example, instance, or illustration. Any embodiment or configuration described herein as "exemplary" is not necessarily to be construed as preferred or advantageous over other embodiments or configurations. Rather, use of the word exemplary is intended to present concepts in a concrete manner.

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain, e.g., using photonic signal processing.

Figure 1:
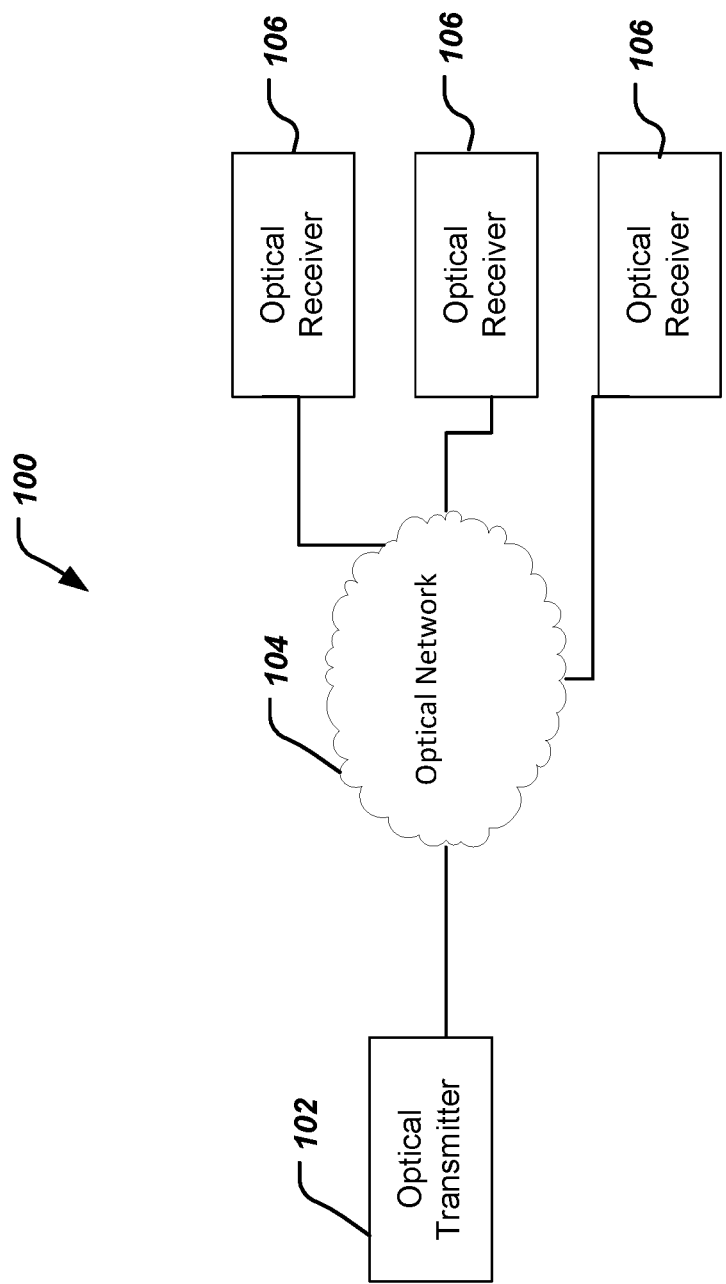
FIG. 1 shows an example of a communication network.

FIG. 1 depicts an optical communication system 100 in which the presently disclosed technology can be embodied. One or more optical transmitters 102 are communicatively coupled via an optical network 704 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity. Various techniques disclosed in this document can be implemented by apparatus 102, 106 in the transmission network 100.

Discussion

Recent progress in digital coherent technologies has opened new horizons for achieving single-carrier channel with higher data rate to meet the growing bandwidth demand in the long-haul and metropolitan optical links.

Two techniques, among many techniques used to increase available channel capacity to meet next-generation single-carrier optical coherent transmission systems, may be (1) to increase the signal baud rate and (2) use higher and higher levels modulation formats, or a combination of both these techniques may also be used. The use of higher modulation formats and greater baud rates in turn rely on availability of high optical signal to noise ratio channels and highly linear components for implementation, without which, any gains in increased baud rates and modulation formats could be negated, at least partially, due to noise and non-linear signal distortions.

Such high-bandwidth systems may attempt to configure major opto-electronic devices in the transmission or reception path to operate beyond their specified bandwidth or linearity region of operation.

For example, pattern-dependent symbol distortion caused by devices' nonlinearity at both transmitter-side and receiver-side is one of the practical limits for high-order QAM system implementation (e.g., 64 QAM or higher constellations). This kind of the nonlinearity can be characterized in form of lookup tables (LUT) that records the averaged symbol distortion for a set of unique symbol patterns. In various embodiments, the length and amount of the patterns can be selected to fit within available memory sizes and to take into account possible values for the modulation levels, respectively.

The LUT based nonlinearity compensation uses high-performance signal quality in order to accurately estimate pattern-dependent distortions after averaging amount of training sequence. Otherwise, the deviation in LUT will lead to sub-optimal even degraded performance.

The present document provides, among others, techniques to effectively perform pre-compensation or pre-emphasis at the transmitter side in order to overcome the bandwidth limitation. In some embodiments, a training-assisted joint equalization approach for both transmitter and receiver may be used to mitigate channel bandwidth constraint and component nonlinearity impairment.

EXAMPLE EMBODIMENTS

Figure 2:
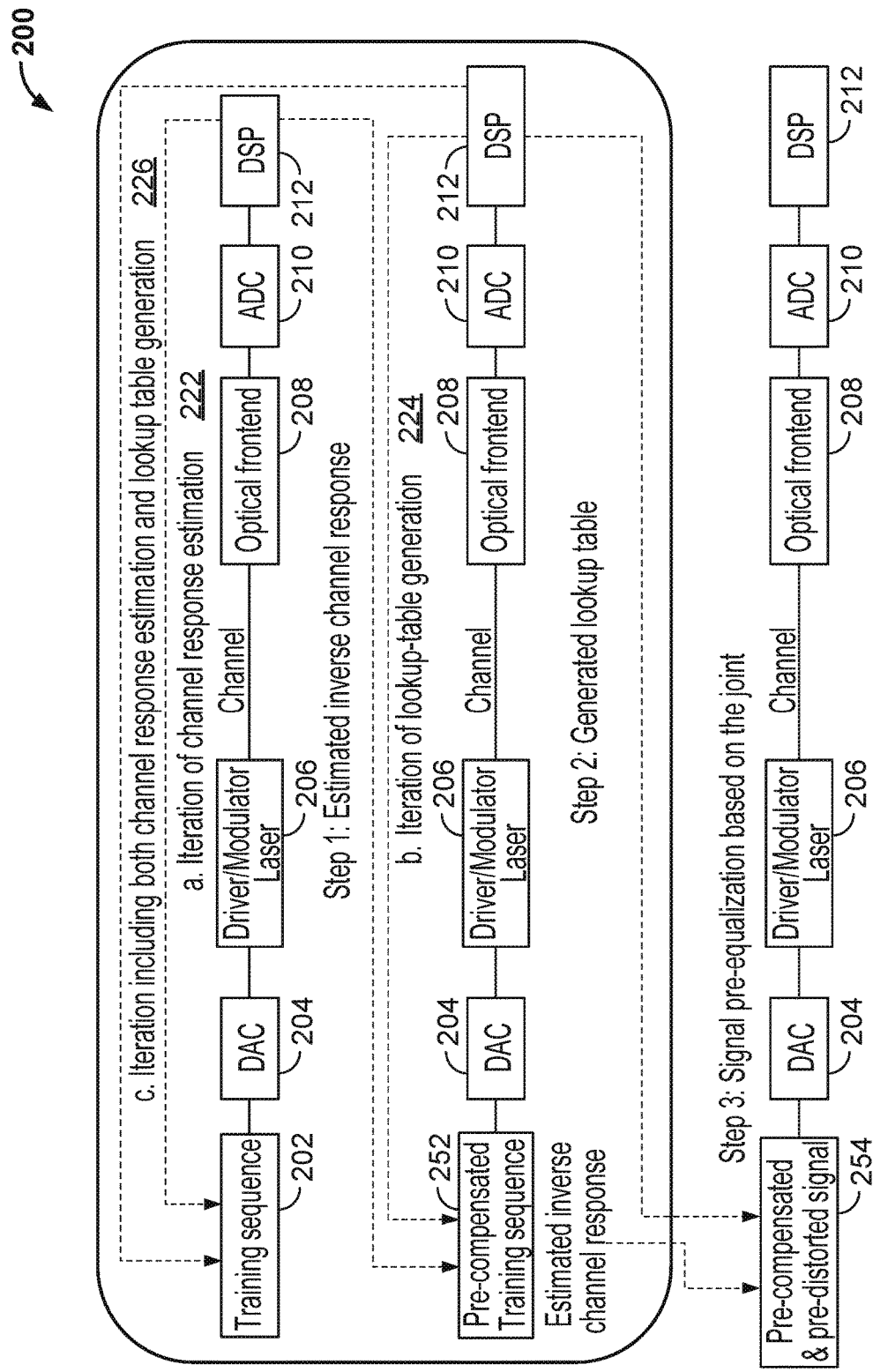
FIG. 2 is a block diagram example of a process of joint optimization.

FIG. 2 shows a block diagram of an example of a joint equalization process 200. Considering the training sequence, which includes a number of known symbols or constellation points as the input of the whole process, the output would be the estimated channel inverse response for pre-compensation and lookup table for pre-distortion. Pre-equalization may be used to mitigate limitations in the amplitude response in the end-to-end system. For example, due to limitations in bandwidth of components and channel, a back-to-back combination of transmitter and receiver may exhibit amplitude loss at high frequencies. Pre-equalization may be performed to compensate for this increased attenuation at higher frequencies by boosting signal power at higher frequencies in a manner that mimics the inverse of the calculated drop in gain as a function of frequency. Pre-distortion may be used to compensate for non-linearity in components used to implement transmitter or receiver modules. Component non-linearity may or may not be related to frequency but may be related to other parameters such as instantaneous signal power, amplitude, phase, etc. For example, it may be possible to achieve perfect pre-equalization, but the resulting system may still exhibit degradation due to non-linearity and may thus also have to be jointly pre-distorted, e.g., by a joint equalization process as described herein.

The process 200 may be implemented in three stages. In the first stage, channel between a transmitter and a receiver may be estimated, e.g., by estimating an inverse of channel response to compensate for the channel. In the second stage, a same or different training sequence may be passed through the same channel from the transmitter to the receiver, this time by pre-equalizing using the channel estimate and a pattern-dependent LUT may be generated.

The example embodiment depicted in FIG. 2 shows a module 202 that generates the training sequence symbols. A digital to analog conversion (DAC) module 204 may generate analog signals from the symbols generated by the module 202. The output of the DAC 204 may be used to drive a modulator, e.g., a laser modulator 206, to generate a modulated optical signal. The modulated optical signal may be transmitted over a channel to the receiver, where an optical front end 208 may receive a version of the modulated optical signal that has undergone changes due to the channel. The optical front end 208 may process the received signal, e.g., converting the optical signal to electrical domain, and produce an electrical signal input for the analog to digital conversion (ADC) module 210. The ADC module 210 produces digital symbols that are then processed through a digital signal processor (DSP) 212 for generation of LUT.

Example Embodiments of the First Stage

In order to obtain a reasonable signal quality for an effective LUT creation, in the first stage, embodiments may use the training sequence to estimate inverse channel response to perform pre-equalization process. It is either based on the transfer function of receiver-side adaptive equalizer in the DSP module or a zero-forcing method. As indicated by the dashed feedback line, the channel response estimation stage may be implemented by performing multiple iterations. In the first stage, or the pre-equalization stage, the receiver may communicate its estimate of the inverse of the channel response to the transmitter in a communication message. The estimate may be represented as a linear FIR or IIR filter. The transmitter may receive filter coefficient values, store in a local memory and may filter, or pre-equalize, subsequent training symbols using the estimate of the inverse of channel response for further use. This process may be iterated multiple times to arrive at an accurate estimate of the inverse channel response.

Example Embodiments of the Second Stage

In the second stage, the training sequence being used in the second stage is pre-equalized using the inverse channel function estimate obtained in the first stage. The pre-equalized training sequence is then passed through the same channel and LUTs are generated based on the received signal. In some embodiments, the same training sequence may be used for the channel estimation and for training sequence pre-equalization of the generation of LUT. Alternatively, in some embodiments, different training sequences may be used for channel estimation and for LUT generation. In some embodiments, training sequences that include symbol patterns of all possible combinations of neighboring symbols may be used for LUT generation, while training sequences that have a relatively flat frequency response may be used for channel estimation. The length of training sequences may be selected based on available memory at the receiver and/or the transmitter to store the training sequences, intermediate results and LUTs. The pre-equalized training sequence is passed through the same channel to generate the pattern dependent LUT through comparing the transmitted signal with the corresponding recovered ones. As indicated by the dashed line 224, the stage of passing signal through the transmitter-receiver by ore0compensating the training sequence for LUT generation may be iterated multiple times to improve the accuracy of the LUTs. In some embodiments, the number of iterations used may be based on determining whether the improvement achieved from one iteration to the next is still above a minimum threshold (e.g., least mean squares error improvement). In some embodiments, a fixed number of iterations may be performed, e.g., 2 to 10 iterations. Other possibilities include performing iterative optimization until a certain time period hasn't expired, or until number of computations are below a threshold, and so on.

Example Embodiments of the Third Stage

In the third stage, after the previous two stages, which may be iteratively performed independent of each other, a joint iteration process to further positively optimize the linear and nonlinear estimations of two aforementioned stages may be performed.

In this stage, embodiments may apply the obtained inverse channel response and LUT into the transmitted signal for the pre-compensation and pre-distortion. One advantageous use of the iterative channel response estimation is to accurately equalize the bandwidth limitation in perspective of channel amplitude response. Meanwhile, the pre-distortion process performs much accurate pattern alignment because of the significant improvement of bit error level in cascade with the pre-compensation process.

The third stage, or the joint equalization stage, may be performed iteratively until no additional benefits from iterations are seen.

Example Experimental Setups

Figure 3A:
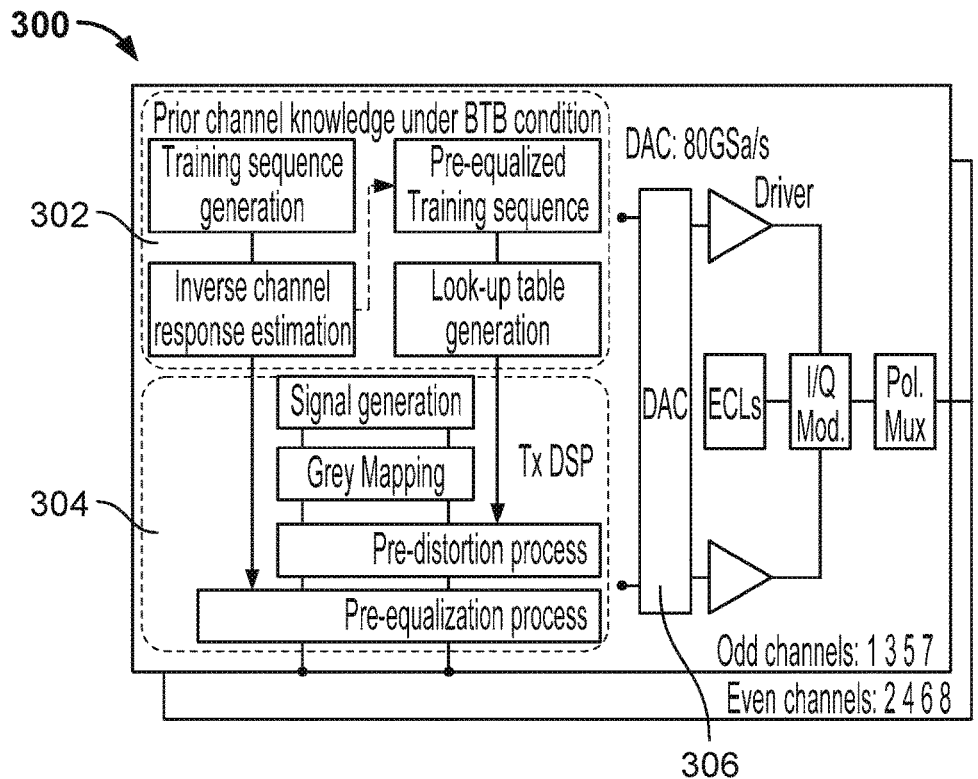
FIG. 3A shows an example of transmitter used in a polarization division multiplexing transmission system.
Figure 3B:
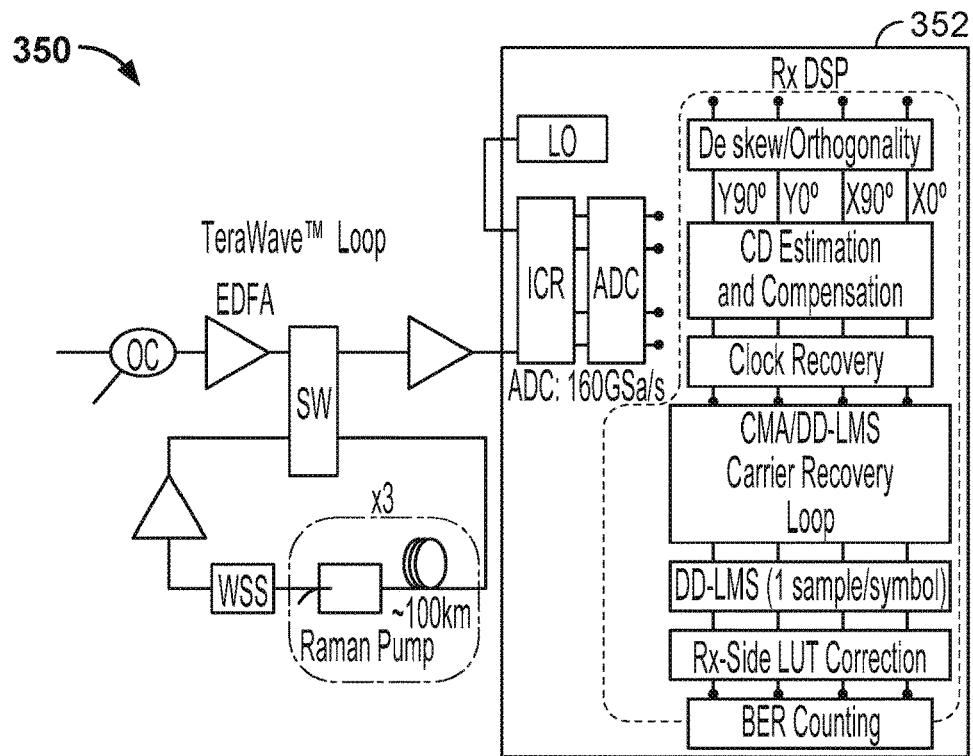
FIG. 3B show an example of receiver used in a polarization division multiplexing transmission system.

As shown in the example block diagram of FIG. 3A and FIG. 3B, the disclosed training-assisted joint equalization approach can also be used in a polarization-division multiplexing (PDM) coherent optical transmission system with transmit side 300 depicted in FIG. 3A, and the transmission channel and the receive side 350 depicted in FIG. 3B. The system 300 shows a single-carrier 400G solution based on 51.25-GBaud PDM-32 QAM signal at 6.15-b/s/Hz SE over 1200-km transmission distance.

At the transmit side, even and odd optical channels are multiplexed together for transmission on the optical network. As indicated by the subsystem 302, channel knowledge derived from back-to-back training, e.g., as described with respect to FIG. 2, is performed a priori. This training includes training sequence generation, inverse channel response estimation, pre-equalized training sequence generation and LUT generation. One example training sequence may be long enough to include every possible symbol pattern in a given run length (e.g., a 3-symbol run).

Further at the transmitter-side 300, a transmission subsystem 304 may generate information bits using a signal generation module that may generate random bit patterns for testing and may receive information bits such as user data and other network traffic for transmission to the receiver side. The symbols may be gray coded prior to transmission, as is known in the art. The gray coded symbols may then undergo pre-distortion and pre-equalization using the values determined from the a priori calculations. The pre-distortion may be applied to the individual signal values as an additive correction to the symbols. The pre-equalization may be performed by filtering the symbols through a filter that represents the inverse channel transfer function. The filter may be a linear filter that may be a finite impulse response (FIR) filter of an infinite impulse response (IIR) filter. As disclosed herein, the use of training assisted pre-compensations and both transmitter and receiver based LUT are advantageously used to mitigate channel bandwidth constraint and component nonlinearity impairment.

At the transmitter-side 300, the generated symbols are then processed through a digital to analog convertor (DAC 306) and through gain adjusting drivers to I-Q modulated and polarization division multiplex generated modulated optical signals.

The optical signal is passed through an optical channel to a receiver. In the experiments performed by the inventors, a TeraWave loop was used to simulate about 100 kilometer optical channel. The signal is then received at a receiver 352 where the received signal at an optical front end which may be, e.g., an integrated coherent receiver (ICR) which receives a local clock signal from a local oscillator (LO). The signal is then polarization division de-multiplexed and converted into digital domain (electrical) using an analog to digital convertor.

Additional signal processing functions may be implemented in the digital domain using a digital signal processor 354 or alternately performed using a mixture of electronic circuits and processor based software implementations. These include, de-skewing the received signal to restore orthogonality, estimating chromatic dispersion (CD) and compensating using the estimate, a digital phase lock loop for clock recovery, an optimization algorithm to minimize a measure of error, e.g., DD-LMS or constant modulus algorithm (CMA).

Example Embodiments of Inverse Channel Response Estimation and LUT Generation

Figure 4A:
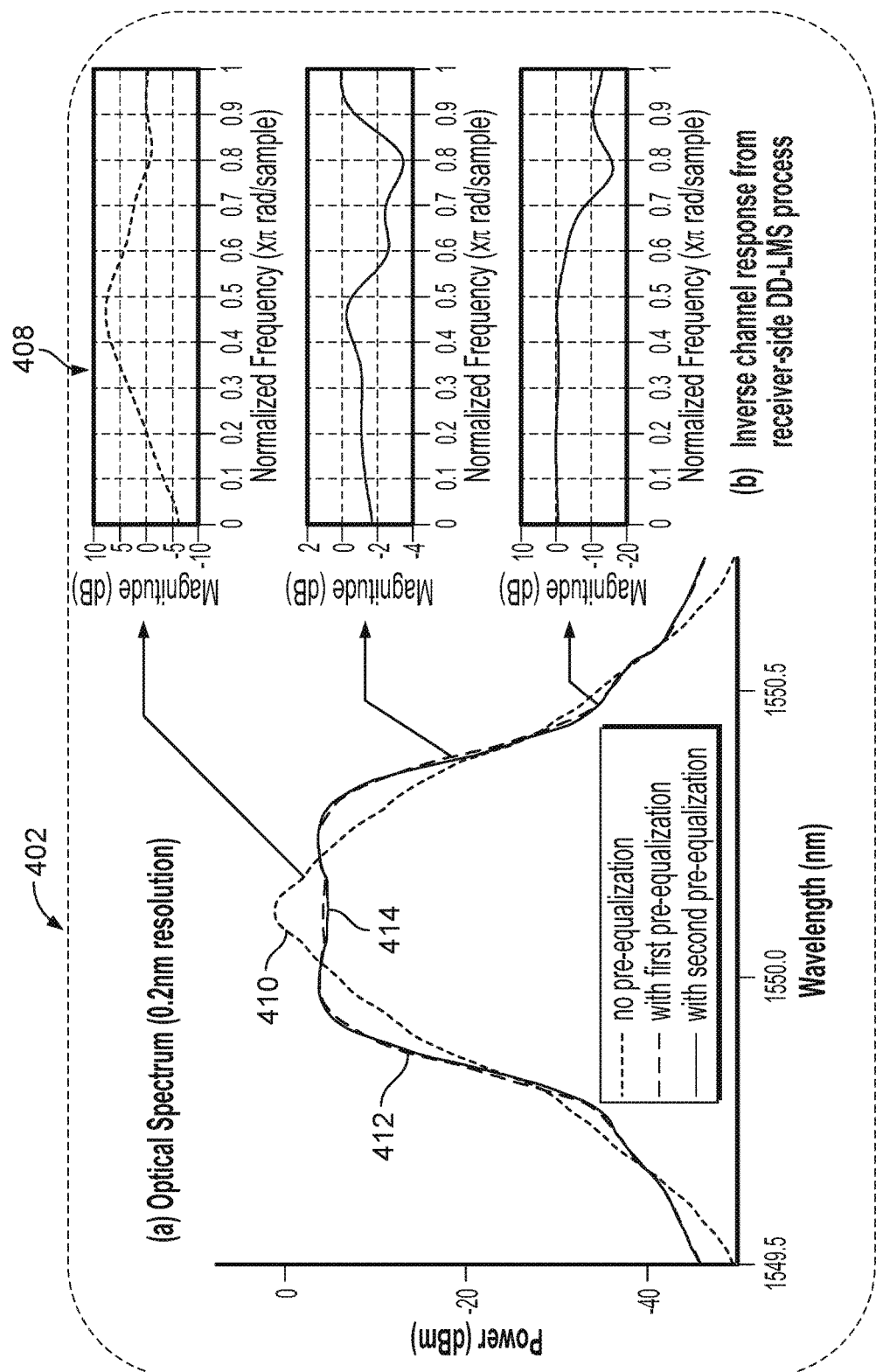
FIG. 4 shows examples of spectrum of optical signals in the joint optimization system.
Figure 4B:
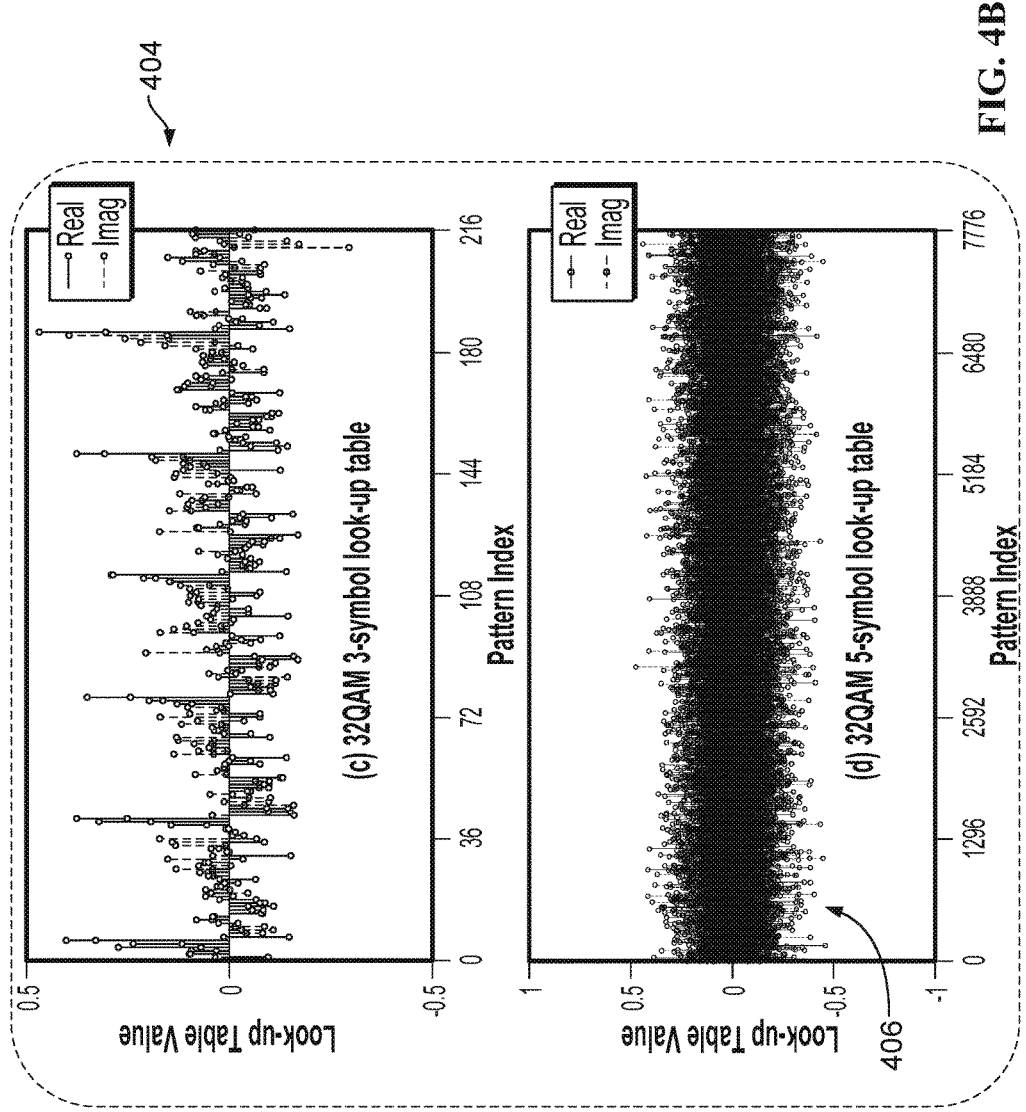

FIG. 4 shows example results obtained by inventors by performing simulations for the theoretical curve and simulations performed on the setup depicted in FIGS. 3A and 3B. Graph 402 shows three spectra, without pre-equalization (410), with first iteration of pre-equalization (412) and with second iteration of pre-equalization (414). Graph 408 shows the corresponding magnitude versus normalized frequency curves of the estimated inverse channel response. As shown in graphs 402 and 408, then a flat channel response is obtained after two cascade pre-equalizations. The curves 410, 412, 414 also show that the iterations quickly converge and by second iteration, a relatively flat optical spectrum is achieved, indicating that the inverse channel transfer function is a good estimate.

Graph 404 shows an example of a 3-symbol look-up table when each symbol is from a 32 QAM constellation. Graph 406 shows an example of a 5-symbol look-up table, with each symbol being from a 32 QAM constellation. The horizontal axis in the case of 3-symbols for 32 QAM comprises 216 data points ($6^3=216$ patterns) and for 5-symbols, comprises 7,776 data points ($6^5=7776$ patterns), corresponding to the entries of LUT in a memory. The number of distinct symbols may depend on the number of values of symbols for each polarization. For example, for 32 QAM, 6 values may be possible for each symbol [5 3 1 −1 −3 −5].

Examples of Bit Error Rate Results

Figure 5:
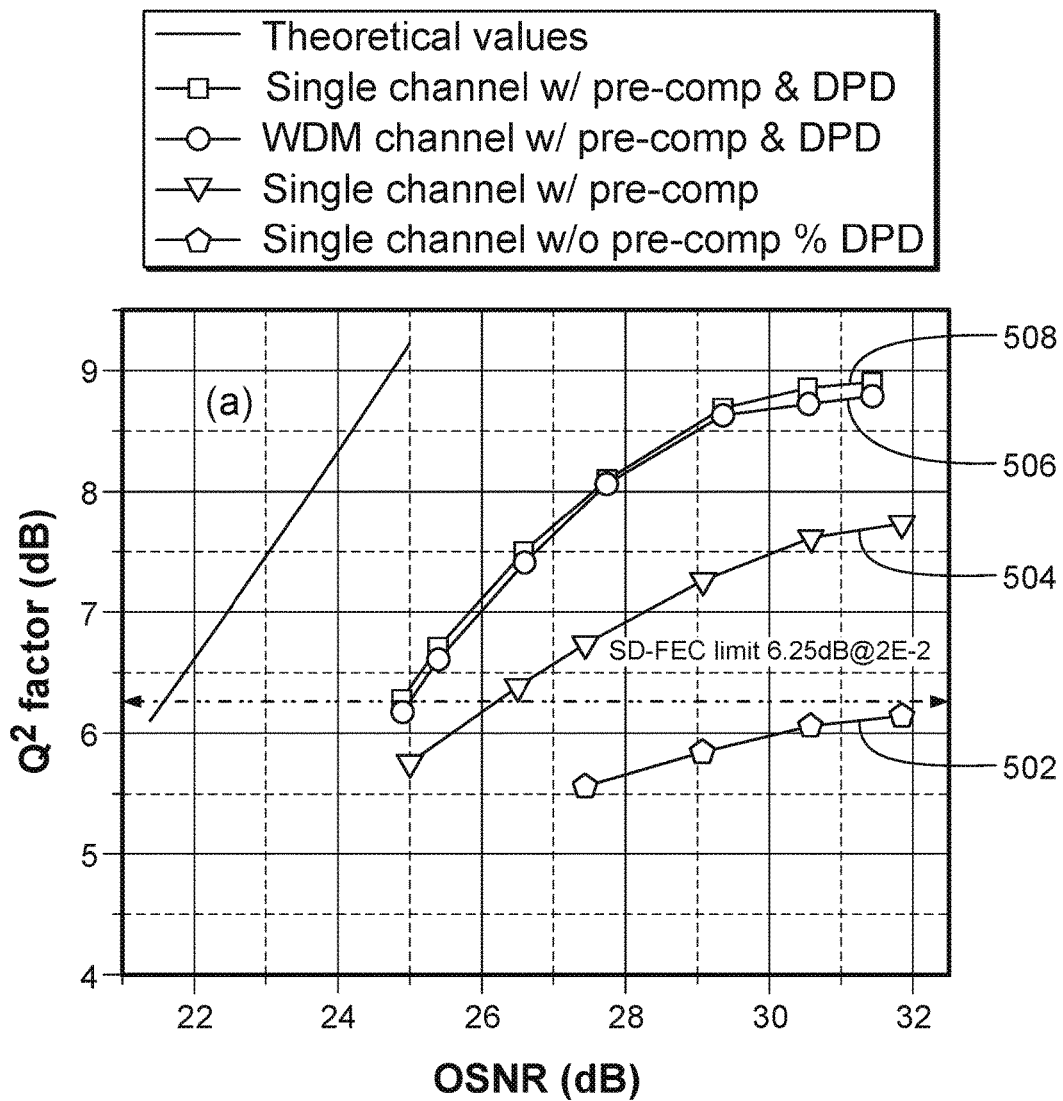
FIG. 5 is a graph depicting example simulation and experimental results.

FIG. 5 shows the BTB $Q^2$-factor results of 51.25-GBaud PDM-32 QAM signals as a function of OSNR (0.1 nm resolution). A low $Q^2$-factor floor exists when there is no pre-equalization and pre-distortion process (curve 502), and significant OSNR improvement is observed when using the cascade pre-equalization process (curve 504). Experiments performed by the inventors also show that pre-distortion can further improve the system performance (506, 508) by 1.2-dB in required OSNR at the soft-decision (SD) -FEC limit ($Q^2=6.25$ corresponding to BER=$2.0\times10^{-2}$). The required OSNR for WDM PDM-32 QAM channel in 65-GHz grid at the SD-FEC limit is about 25 dB/0.1 nm, which has less than 0.25-dB OSNR penalty compared to single-carrier case.

Figure 6:
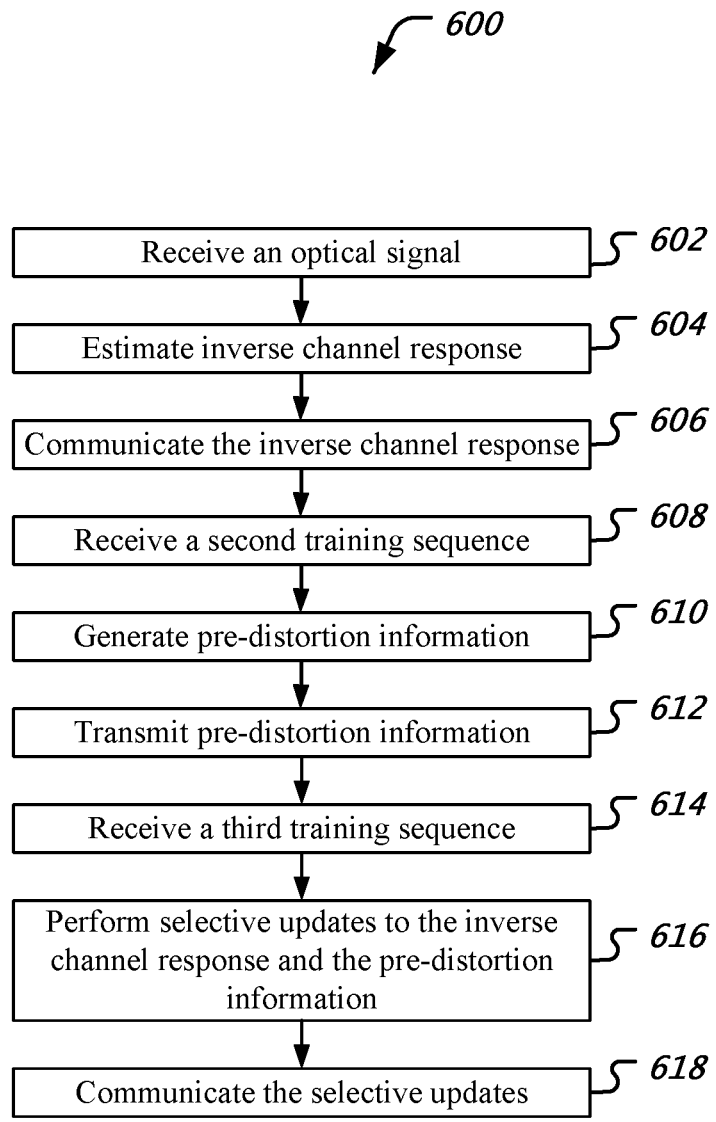
FIG. 6 is a flowchart representation of an example method of optical communication.

FIG. 6 is a flowchart representation of an example method 600 of optical communication. The method 600 may be implemented at a receiver in an optical communication network, e.g., receiver 106 or the receiver depicted in FIG. 2 or receiver depicted in FIG. 3B. The method 600 may be implemented by the receiver in coordination with the transmitter, e.g., based on shared a priori information about the training sequences used and also may be based on a signal exchange to begin the method 600.

The method 600 enables data communication with a transmitter using a jointly equalized signal using three stages of optimization comprising a pre-equalization stage followed by a pre-distortion stage followed by a joint equalization stage. The pre-equalization stage includes receiving (602), over an optical channel, an optical signal carrying a first training sequence of symbols, wherein the first training sequence is known a priori to the receiver, processing the optical signal to estimate inverse channel response (604) and communicating the inverse channel response to a transmitter (606). The pre-distortion stage includes further receiving a second training sequence (608) that is pre-equalized using the inverse channel response, generating pre-distortion information from the received second training sequence (610), and transmitting the pre-distortion information to the transmitter (612). The joint equalization stage includes receiving a third training sequence that is pre-equalized using the inverse channel response and pre-distorted using the pre-distortion information (614), selectively updating, based on a possible improvement, the inverse channel response and the pre-distortion information from the received third training sequence (616), and communicating, when updated, the inverse channel response and the pre-distortion information to the transmitter (618).

Figure 7:
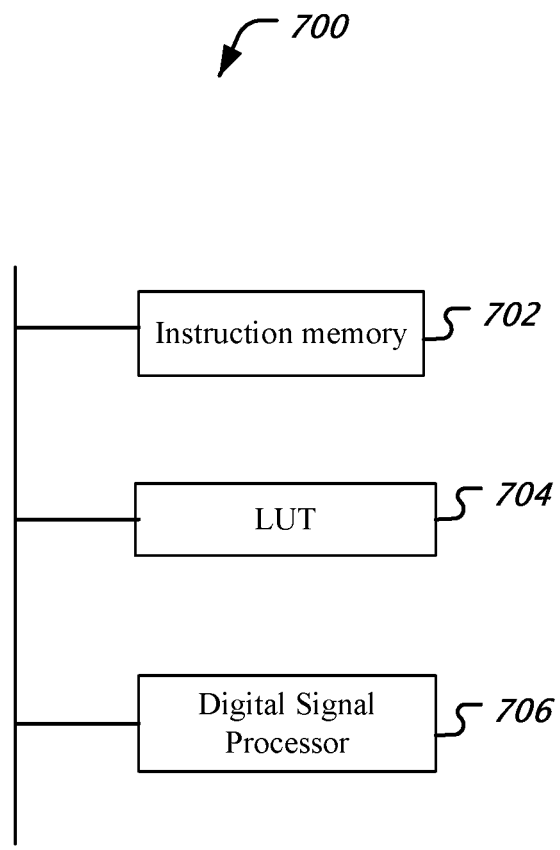
FIG. 7 is a block diagram of an example of an optical communication device.

FIG. 7 depicts an example apparatus 700 for optical communication. The apparatus 700 includes one or more memories for storing instructions, LUTs and pre-equalization information, e.g., the estimate of the inverse of channel response (702, 704). The apparatus 700 also includes a processor 706, e.g., a digital signal processor.

Figure 8:
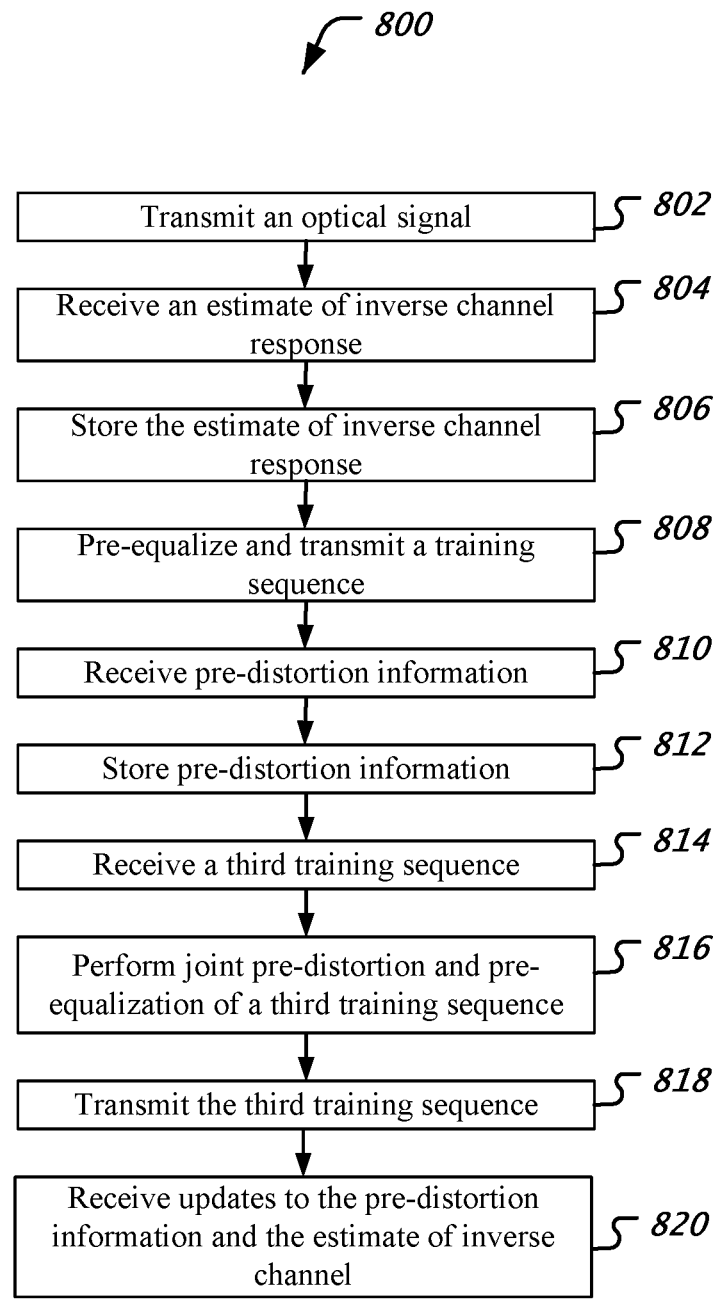
FIG. 8 is a flowchart representation of an example method of optical communication.

FIG. 8 is a flowchart representation of an example method 800 of optical communication. The method 800 may be implemented at a transmitter in an optical communication network, e.g., transmitter 102, transmitter-side depicted in FIG. 2 and FIG. 3A. The method 800 enables data communication with a receiver using a jointly equalized signal using three stages of optimization comprising a pre-equalization stage followed by a pre-distortion stage followed by a joint equalization stage The pre-equalization stage includes: transmitting, over an optical channel, an optical signal carrying a first training sequence of symbols (802), receiving an estimate of inverse channel response (804), and storing the estimate of the inverse channel response at the transmitter (806). The pre-distortion stage includes pre-equalizing and transmitting a second training sequence using the estimate of the inverse channel response (808), receiving pre-distortion information generated based on the second training sequence (810), and storing the pre-distortion information at the transmitter (812). The joint equalization stage includes jointly performing pre-distortion and pre-equalization of a third training sequence using the estimate of the inverse channel response and the pre-distortion information to generate a pre-distorted and pre-equalized third training sequence (816), transmitting the pre-distorted and pre-equalized third training sequence over the optical channel (818), and receiving, based on the pre-distorted and pre-equalized third training sequence, updating information for updating the estimate of the inverse channel response and the pre-distortion information stored at the transmitter (820).

With reference to method 600 and 800, including as disclosed in the claims, each stage, namely, the pre-equalization stage, the pre-distortion stage and the joint equalization stage could be iteratively implemented. Although the inventors have found out that two iterations are generally sufficient, various embodiments could use different iteration termination criteria such as relative improvement from one iteration to the next, a time budget, a fixed number of iterations, and so on. Furthermore, the same training sequence may be used during each stage for simplicity.

However, in some embodiments, different training sequences may be used in some stages. For example, for pre-distortion stage, a training sequence that comprises all (or mostly all) possible patterns of N consecutive symbols may be used, while for the pre-equalization stage, a training sequence that exhibits a relatively flat spectrum over the bandwidth of interest may be used.

Exemplary Embodiments of PDM-32 QAM Single-Carrier 400G over 1200-km Transmission Optical transport of per-channel data rate beyond 100 Gb/s is now under development to sustain the traffic growth, improve spectral efficiency (SE), as well as to lower cost per bit in fiber transmission systems. In that respect, 400-Gb/s data rate per channel has emerged as a natural and promising step as a result of the consideration on both the evolution of datacom and transport interface speed and the implementation complexity. The dual-carrier 400G schemes based on 8 QAM and 16 QAM modulation formats have been experimentally demonstrated and the time-domain hybrid 32/64 QAM 400G solution based on multiple subcarriers was also reported. To further reduce the complexity, 400G transmission on a single optical carrier has been presented as an attractive solution. There exist two dimensions to scale the channel capacity to single-carrier 400G: the increase of signal baud rate or the use of higher-level modulation formats. The transmission of single-carrier 128.8-GBaud QPSK signals over 6078-km distance has been demonstrated with the net SE of 4 b/s/Hz. But it requires pushing the operation bandwidth to the boundaries of opto-electronic components and lacks the transmitter-side DSP flexibilities because of the use of the fixed electrical multiplexer. An embodiment of a single-carrier 400G solution is disclosed hereinafter. The embodiment is based on 51.25-GBaud PDM-32 QAM signal at 65-GHz grid, achieving a net SE of 6.15 b/s/Hz for the first time. The transmission distance is extended to 1200 km at a pre-FEC BER threshold of 2×10−2. The combination of training-assisted pre-compensations and both transmitter and receiver based distortion look-up table are employed to enable the mitigation of channel bandwidth constraint and component nonlinearity impairment.

Exemplary Setup

Figure 9:
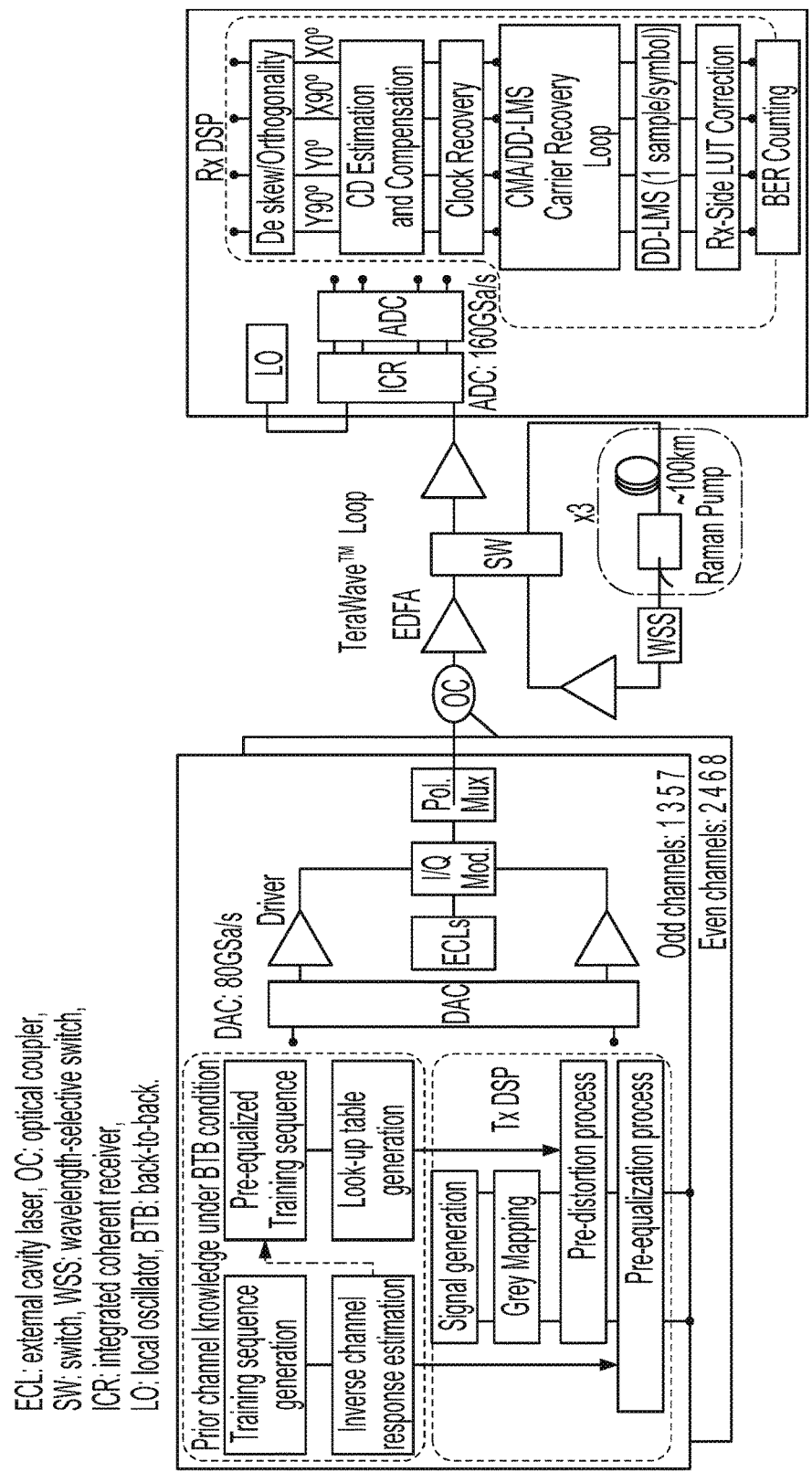
FIG. 9 shows an exemplary setup of eight 400G channels.

FIG. 9 shows the experimental setup of eight 400G channels, each modulated with PDM-32 QAM at 51.25 GBaud (512.5 Gb/s raw data rate). The 62.5-GHz channel spacing is configured for achieving the net SE of 6.15 b/s/Hz. Eight tunable external cavity lasers (ECLs) with the linewidth less than 100 kHz are divided into odd and even channels and then modulated by two independent I/Q modulators followed by polarization division multiplexers. Modulators are driven by a DAC operating at 80 GSa/s with the analog bandwidth of 20 GHz. A test sequence with a word length of $2^{15}$ is generated and Gray-mapped. The pre-distortion and pre-equalization algorithms are then performed to mitigate channel impairments.

Then the odd and even multiplexed signal is boosted and fed into the re-circulating loop made of three 100-km spans of TeraWave™ fiber with an average effective area Aeff of 125 μm2, an attenuation coefficient of 0.183 dB/km (20-dB span loss including connectors) and a chromatic dispersion coefficient of 20.0 ps/(nm·km) at 1550 nm. One backward-pumped Raman amplifier with about 20-dB on-off gain is used for each span to compensate the loss. The average power of the Raman pumps is about 980 mW. One attenuator is used to control the launch power per channel. Also, one WSS is employed to flatten the gain slope band-pass filter. At the receiver side, the channel under test is sent to the integrated coherent receiver (ICR). The output electrical signals are sampled at 160 GSa/s by a real-time digital oscilloscope with 65-GHz electrical bandwidth. The received samples are processed by offline digital signal process (DSP). The DSP includes compensation of frontend distortion, estimation and compensation of chromatic dispersion (CD), followed by time-domain based clock recovery (CR). Then the polarization demultiplexing is realized using a 21-tap T/2 spaced butterfly equalizer based on constant-modulus algorithm (CMA for pre-convergence) and decision-directed least mean square (DD-LMS) loop. Within the DD-LMS loop, the fast Fourier transform (FFT) based carrier frequency recovery and blind phase search (BPS) based phase recovery are performed. Then outside the loop, additional 1-sample/symbol decision-directed least mean square (DD-LMS) with 33 taps is employed. The receiver-side signal is corrected again based on residual look-up table. The resulting larger than 10 million data are finally decoded for bit error counting and Q2 factor calculation based on the average of two polarizations.

Figures 10A, 10B:
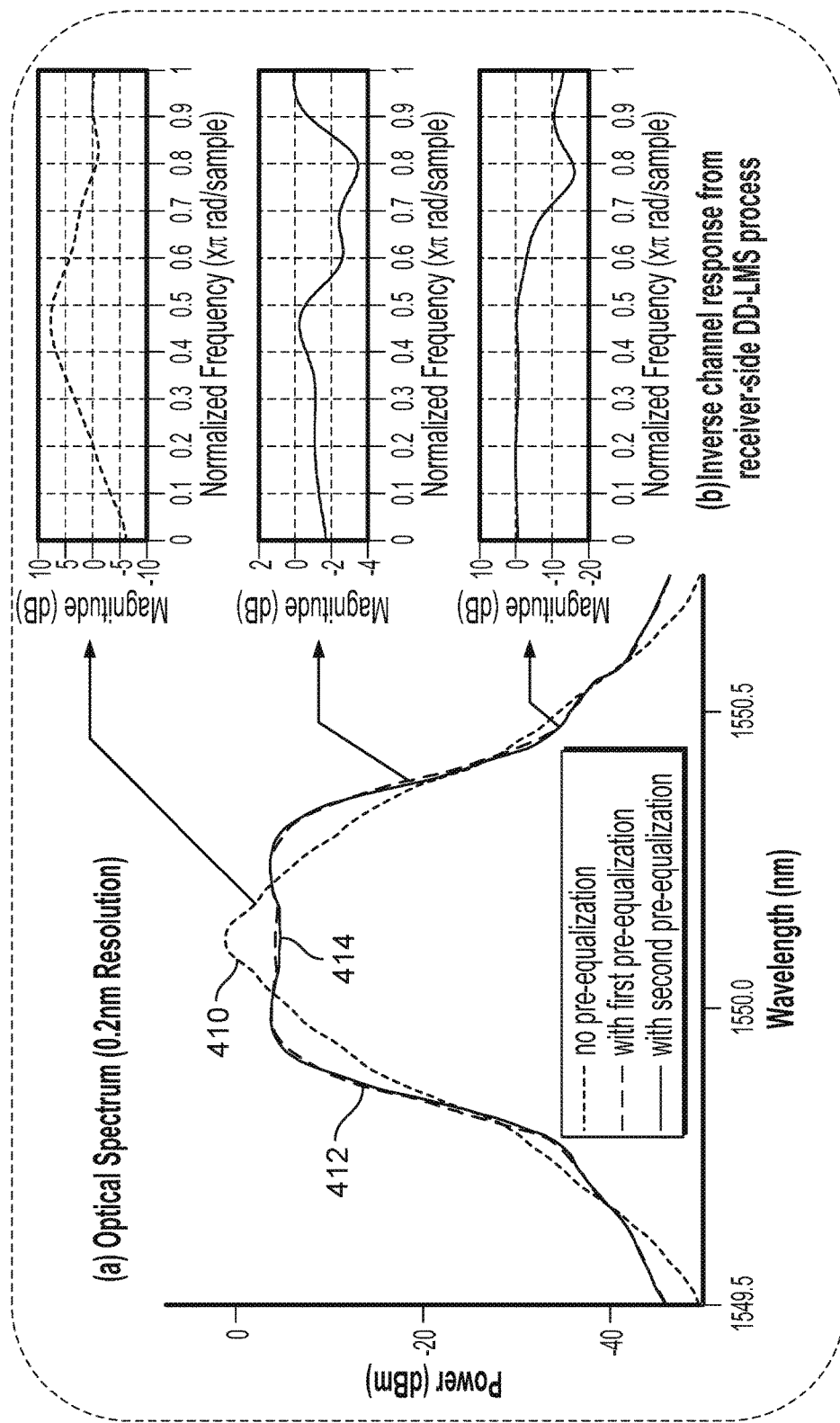
FIG. 10A shows exemplary optical spectra and generated look-up table before and after pre-equalization process.
FIG. 10B shows estimated inverse channel response.
Figures 10C, 10D:
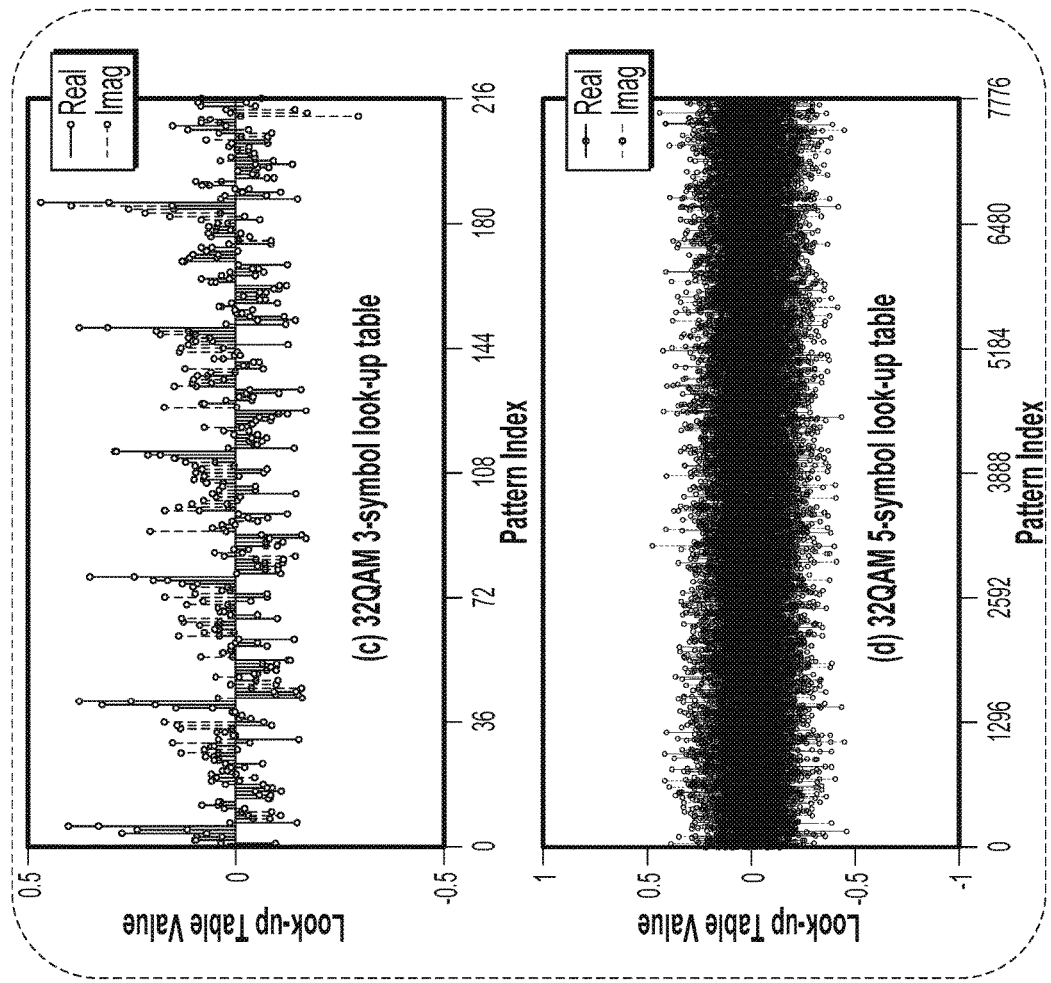
FIG. 10C shows an exemplary 3-symbol look-up table.
FIG. 10D shows an exemplary 5-symbol look-up table.

In order to obtain the reasonable signal quality for effective look-up table creation, the training sequence is used to estimate inverse channel response to perform pre-equalization process. It is based on the transfer function of receiver-side adaptive equalizer in the DSP module. As shown in FIGS. 10A and B, the flat channel response is obtained after two cascade pre-equalizations. Then in the second step, the training sequence is pre-equalized and passes through the same channel to generate the pattern dependent look-up table through comparing the transmitted signal with the corresponding recovered ones. FIGS. 10C and 10D show the look-up tables in the case of 3-symbol ($6^3$=216 patterns) and 5-symbol ($6^5$=7776 patterns) memory implementations. Both cases are trained under back-to-back (BTB) self-homodyne coherent condition. The input testing sequence of DAC is then pre-distorted and pre-equalized via prior obtained both look-up table and channel response.

Experimental Results

Figure 11A:
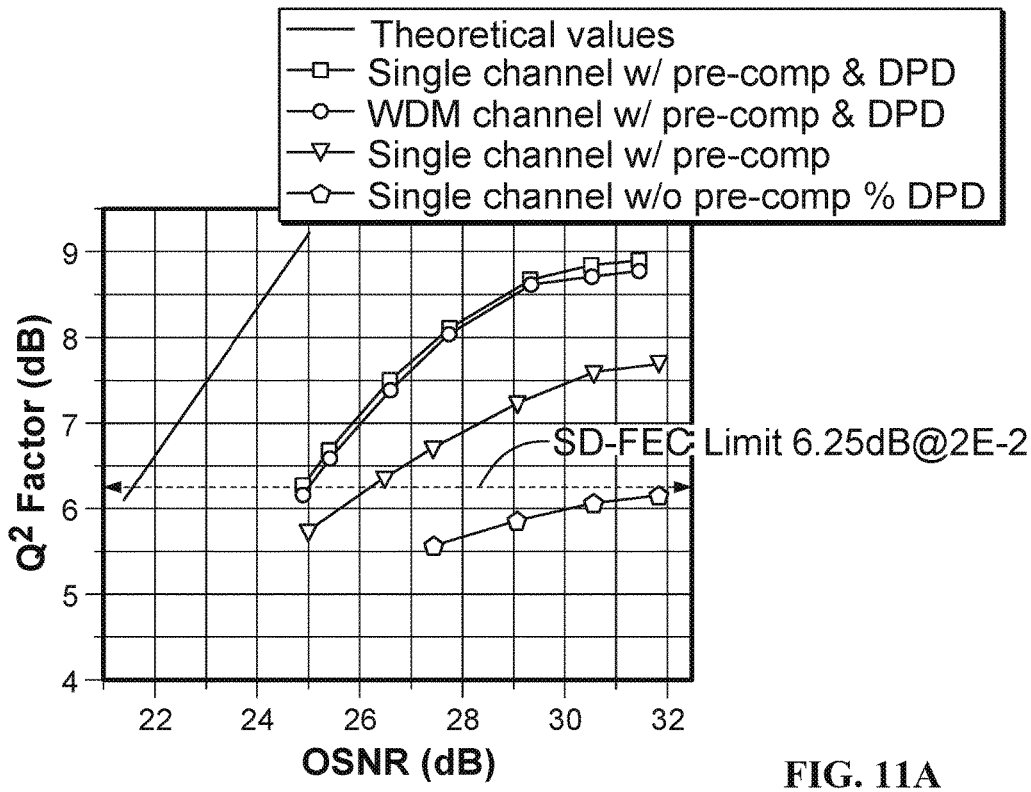
FIG. 11A shows exemplary single-carrier PDM-32 QAM 400G experimental results for BTB performance at different cases.
Figure 11B:
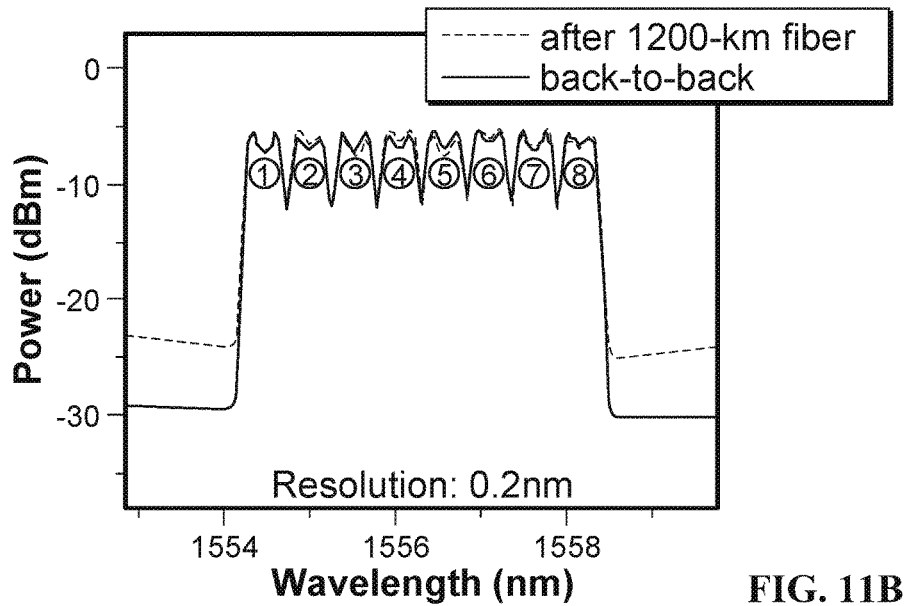
FIG. 11B shows exemplary single-carrier PDM-32 QAM 400G experimental results for optical spectra before and after transmissions.

FIG. 11A shows the BTB $Q^2$-factor results of 51.25-GBaud PDM-32 QAM signals as a function of OSNR (0.1 nm resolution). A low $Q^2$-factor floor exists when there is no pre-equalization and pre-distortion process, and significant OSNR improvement is observed when using the cascade pre-equalization process. It is also found that pre-distortion can further improve the system performance by 1.2-dB in required OSNR at the soft-decision (SD)-FEC limit ($Q^2$=6.25 corresponding to BER=2.0×10$^{-2}$). The required OSNR for WDM PDM-32 QAM channel in 65-GHz grid at the SD-FEC limit is about 25 dB/0.1 nm, which has less than 0.25-dB OSNR penalty compared to single-carrier case. It was also observed that the performance of the 512.5 Gb/s PDM-32 QAM carrier is about 3.5 dB away from the theoretical FEC limit, which is mainly attributed to the residual imperfect response and limited bandwidth of the transmitter and receiver. In addition, it was verified that all other channels exhibit similar performance. The optical spectra of eight 400G channels for BTB and after 1200-km transmission are shown in FIG. 11B for 51.25-GBaud single-carrier PDM-32 QAM over 65-GHz optical grid at a resolution bandwidth of 0.2 nm.

Figure 12B:
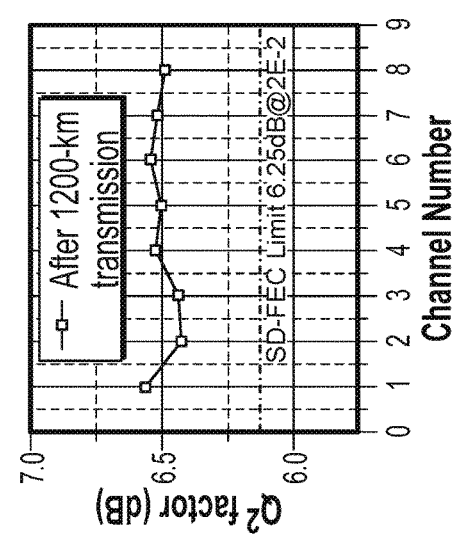
FIG. 12B shows exemplary transmission performance.
Figure 12C:
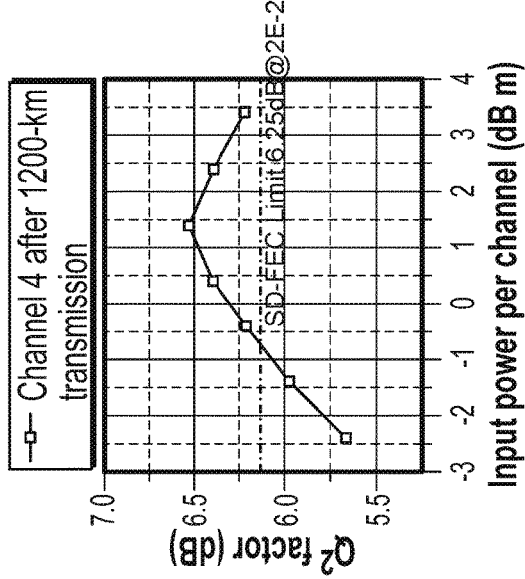
FIG. 12C shows exemplary $Q^2$ factors of all eight channels after 1200-km transmission.
Figure 12A:
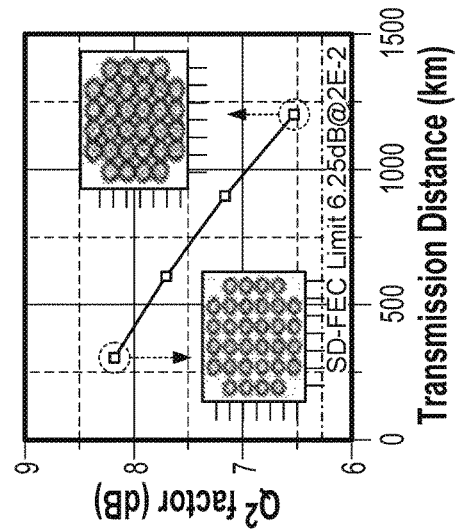
FIG. 12A shows exemplary transmission results for launch power test.

The WDM transmission results are shown in FIGS. 12A-C. The launch power performance is depicted in FIG. 12A for single-carrier 512.5-Gb/s PDM-32 QAM signal at channel 4 over 1200-km distance. The optimal input power is around 1.4 dBm per channel. At this optimum launch power, the transmission performance was evaluated and depicted in FIG. 12B after averaging all the channels at each distance. A maximum reach of 1200 km is achieved at $Q^2$ factor of 6.5 dB, which is above the SD-FEC limit. The corresponding constellations are also inserted in FIG. 12B. Finally, FIG. 12C shows the $Q^2$ factors of all eight channels after 1200-km transmission, which are all above the SD-FEC limit as well.

Additional Information Regarding Iterative Nonlinear Compensation

The receiver-side LUT correction may be used to compensate for non-linearity, as demonstrated above. When communicating data between two devices coupled over a network connection, at the transmitted side, signals are generated based on the information bits to be transmitted, and at the receiver side, information bits are recovered from signals received via the network connection. During the process of signal generation and reception, the electrical or optical n waveforms that carry the information bits are processed through electrical or optical components, e.g., amplifiers, modulators, switches, multiplexers, transmitters, etc., which may exhibit non-linearity or other non-ideal behavior causing the actual signal in an apparatus to be different from an ideal mathematical representation of the signal.

Pattern-dependent symbol distortion is one example of such distortion caused by device nonlinearity at both transmitters and receivers. This type of distortion is caused by the influence of neighboring signal values on signal value at a given time instant. The distortion may occur, e.g., due to non-ideal time and/or frequency domain behavior of circuits and components used for signal processing.

Modern digital communication systems often use modulation schemes in which transmitted symbols represent multiple information bits. For example, Quadrature Amplitude Modulation technique with 4 to 10 bits per symbol (16 QAM to 512 QAM) may be used in some embodiments. Because adjacent symbols in general may have different values, the distortion causes due to neighboring symbol may depend on bit pattern of the data being carried by the symbols. The pattern-dependent symbol distortion is one of the practical limits for high-order QAM system implementations.

In some embodiments, a technique called digital pre-distortion (DPD), may be used to compensate nonlinearity at the transmitter. The technique may include estimating the end-to-end system's nonlinearity based on training sequences, and then offsetting that amount of nonlinearity at the transmitters. For example, a known training signal may be transmitted from the transmitter and received at the receiver and measurements may be performed at the receiver to determine the non-linear distortions suffered by the known training signal.

The nonlinearity can be characterized in form of lookup tables (LUT) that record the averaged symbol distortion as a function of a set of unique pattern indexes. The length and amount of the unique patterns may be governed by the memory sizes and the modulation levels, respectively.

Alternatively, or additionally, in some embodiments, the nonlinearity may be treated as a "black box" between the transmitter and the receiver in the system's diagram, and may be modeled by approximating as a transfer function in form of a memory polynomial.

In some embodiments, a post-compensation may be used at the receiver-side to compensate for the non-linearity distortions. The post-compensation may be used instead of, or along with, the LUT or memory polynomial approaches, and thus can be used standalone or together with the pre-compensation to achieve a better end-to-end performance.

Through experimentation, the inventors have realized that the training-based nonlinearity estimation may not be 100% accurate especially in low signal-to-noise (SNR) conditions, and such deviation usually leads to a sub-optimal performance.

Figure 13:
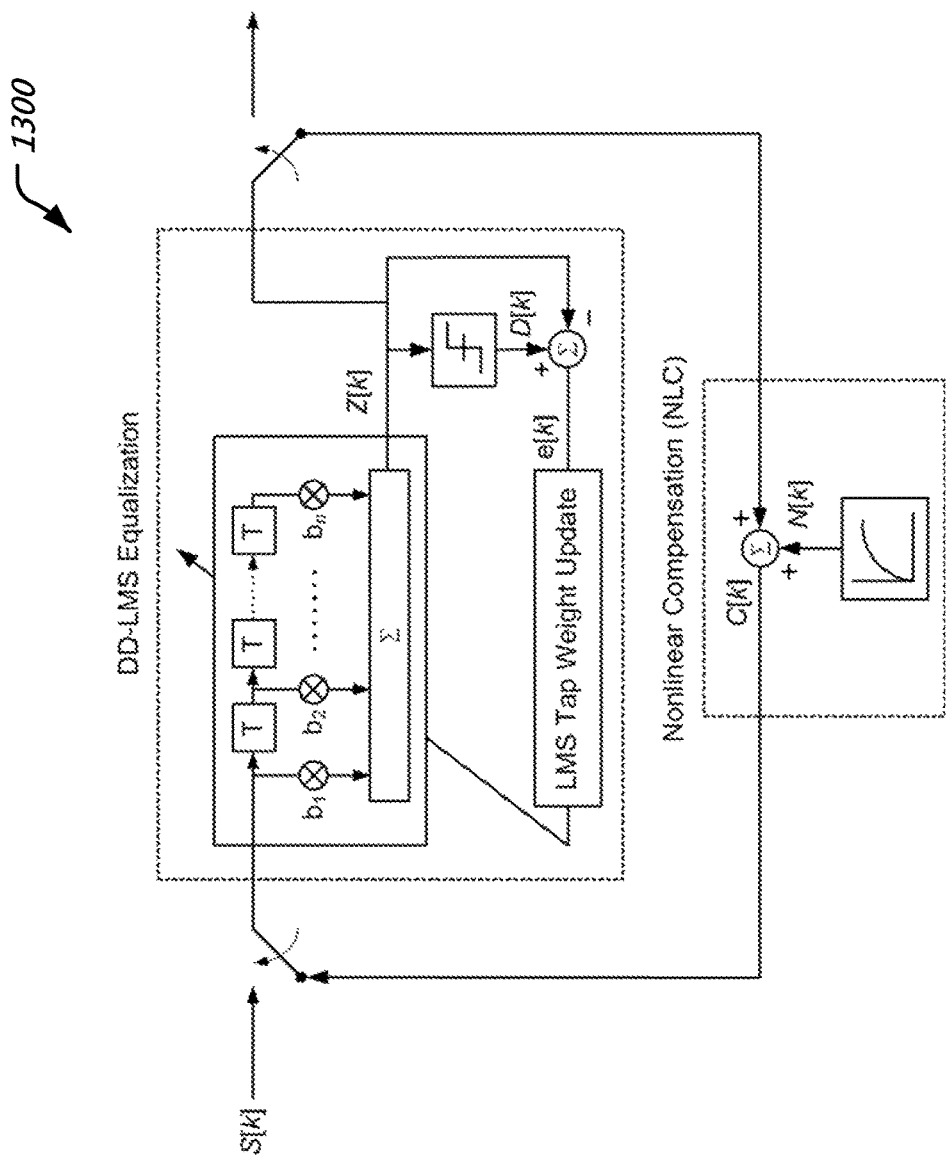
FIG. 13 shows a block diagram of an example of a non-linear compensation scheme.

FIG. 13 is a block diagram showing an example of an embodiment of a recursive nonlinearity compensation technique 1300. In FIG. 13, the following abbreviations are used to represent various architectural blocks and signals:
S[k]: input symbols
Z[k]: output symbols
D[k]: symbols after hard-decision
e[k]: symbol errors
$b_1$ to $b_n$: Tap coefficients of an adaptive filter
N[k]: Pre-distortion amount for each incoming symbols
C[k]: Pre-distorted symbols In addition, two functional blocks, or modules, are shown. A decision-directed least-mean-square (DD-LMS) equalization module, and a nonlinearity compensation (NLC) module. While a DD-LMS module is shown for the sake of explanation, in general, the module may use any error minimization technique, e.g., LMS or $L_1$ or $L_\infty$ error minimization criterion. The DD-LMS module, e.g., may minimize error vector between estimates of symbols and ideal symbols (e.g., known training symbols) based on minimum mean square error of the differences between the symbols.

The recursive process may start by feeding the input symbols S[k] into the DD-LMS equalizer, and then the output symbols Z[k] may be pre-distorted by the NLC block before being fed into the DD-LMS block again. The whole iterative process would be continued until the bit/symbol errors of Z[k] reach a threshold or the marginal improvement from one iteration to the next falls below a threshold.

In some embodiments, the DD-LMS block: may be a typical DD-LMS equalizer that contains an adaptive finite impulse response (FIR) filter with tap coefficients updated by the LMS algorithm.

In some embodiments, the NLC block may be implemented using a LUT approach. The LUT may be established by comparing the transmitting ideal symbols and the received symbols Z[k] after the DD-LMS equalization.

Figure 14:
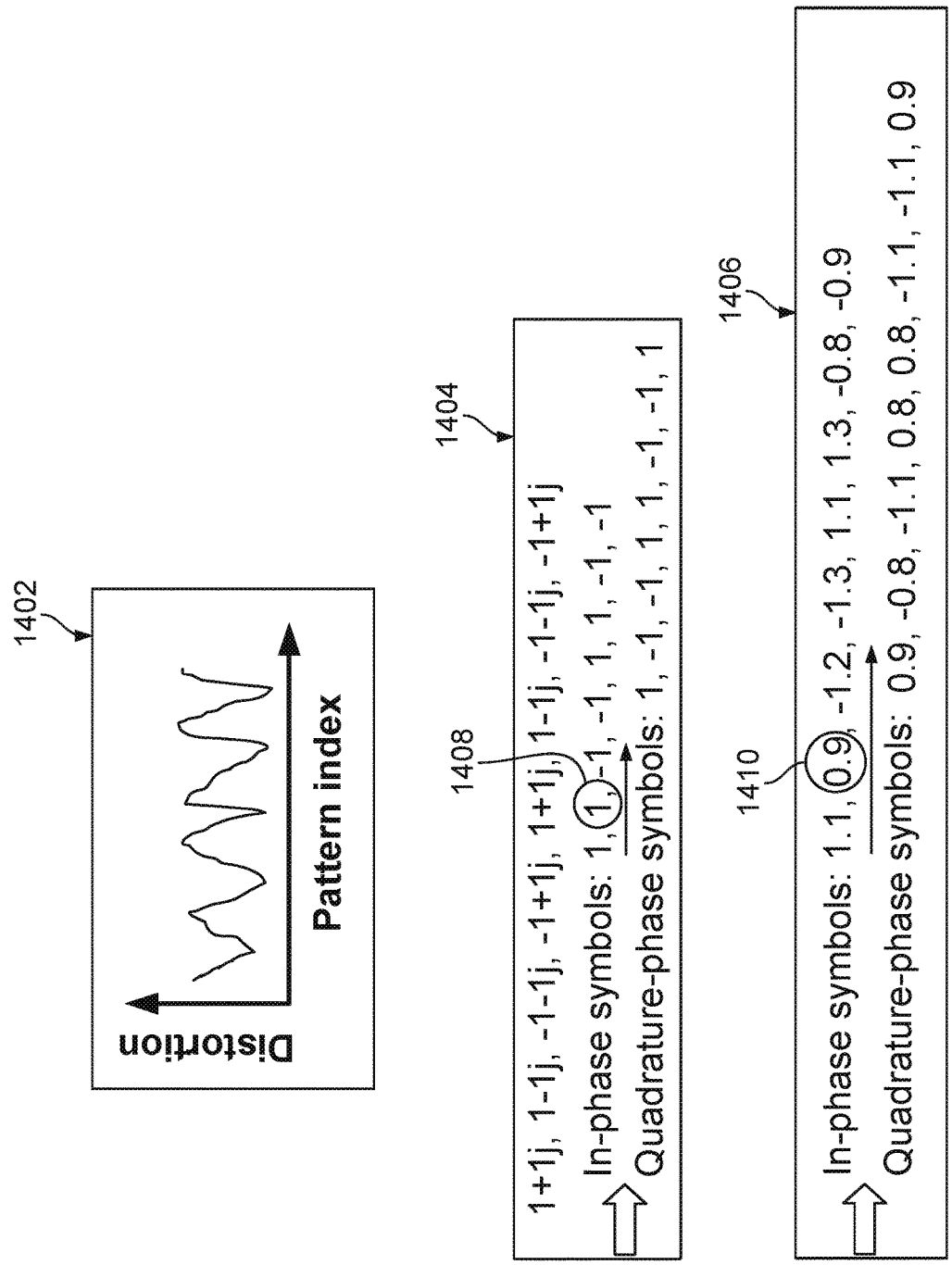
FIG. 14 shows examples of symbol patterns and a graph of observed distortion as a function of symbol pattern.

FIG. 14 provides some examples a process of constructing an LUT. In FIG. 14, an example is provided using Quadrature Phase Shift Keying (QPSK) modulation and using a symbol pattern of three consecutive symbol values for generating the LUT. In general, such LUTs may be constructed for any number of symbol patterns and symbols (e.g., various QAM or QPSK constellations). The graph 1402 shows a plot of measured distortions along the vertical axis as a function of a pattern index along the horizontal axis. The number of data points along which the distortion curve can be plotted corresponds to the total possible number of symbol combinations in the pattern.

For example, a QPSK signal with memory size of three symbols has 8 unique pattern indexes: [1 1 1], [1 1 −1], [1 −1 1], [1 −1 −1], [−1 1 1], [−1 1 −1], [−1 −1 1], [−1 −1 −1], which would therefore be the data points along the horizontal axis in graph 1402.

The listing 1404 shows examples of reference symbol patterns used in generating a LUT for a QPSK signal. The reference symbols used as transmitting symbols may be: 1+1j, 1−1j, −1−1j, −1+1j, 1+1j, 1−1j, −1−1j, −1+1j.

The corresponding in-phase and quadrature symbols are listed in FIG. 14.

The listing 1406 shows an example listing of received symbols after DD-LMS equalization: 1.1+0.9j, 0.9−0.8j, −1.2−1.1j, −1.3+0.8j, 1.1+0.8j, 1.3−1.1j, −0.8−1.1j, −0.9+0.9j.

The corresponding in-phase and quadrature values are shown in the listing 1406.

As a specific example, value of the symbol at the position 1408 is "1." The corresponding value, shown at position 1410, is "0.9." The measured distortion for this central symbol is thus 0.9−1=−0.1, or about 10% (as plotted in graph 1402).

Figure 15:
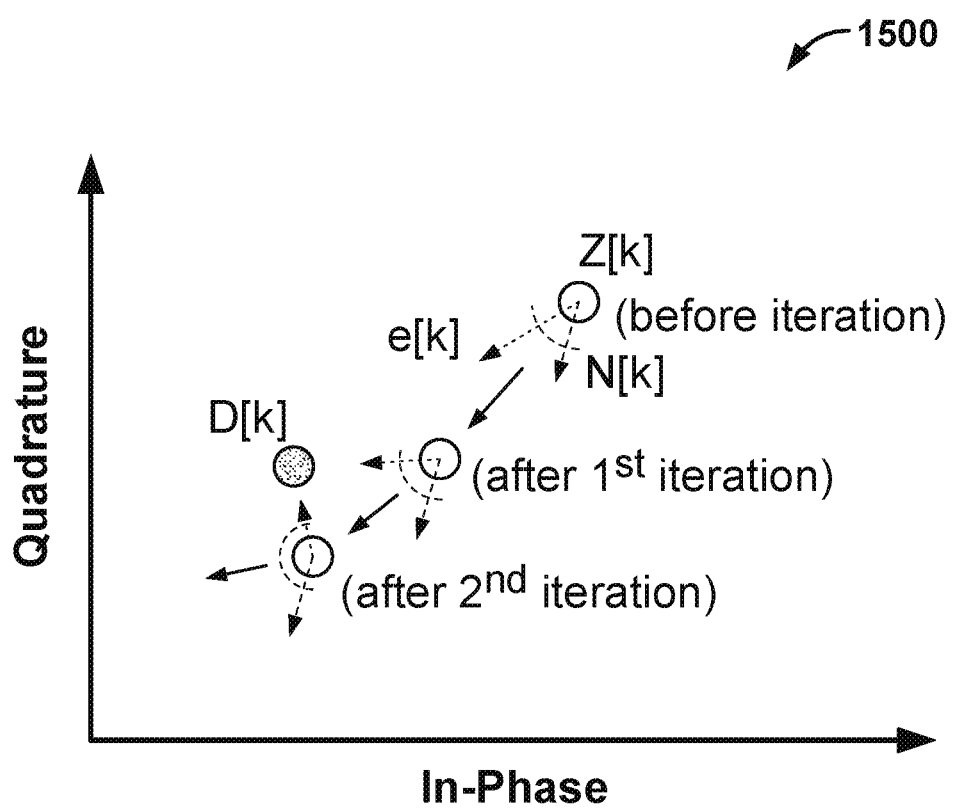
FIG. 15 is an example graph illustrating a method of optimization.

FIG. 15 shows a graphical example of the Relative optimization process 1500. Before the iteration process, the output symbols Z[k] after the DD-LMS equalization have symbol errors e[k] pointed to the desired symbols D[k] in the I-Q plane. These errors are corrected using LUT in the direction of the pre-distortion amount N[k]. Ideally, like e[k], N[k] should also point to the desired symbols D[k]. However, in practice, there exists an angle between e[k] and N[k] since the nonlinearity estimation may not be fully accurate especially in low SNR condition. The use of an iterative process, as described herein, allows the filter coefficients in the DD-LMS equalization to be updated again and again using pre-distorted incoming symbols until e[k] is minimized, thus leading to convergence to the desired symbols.

Example Polarization Multiplexing Embodiments

Figure 16:
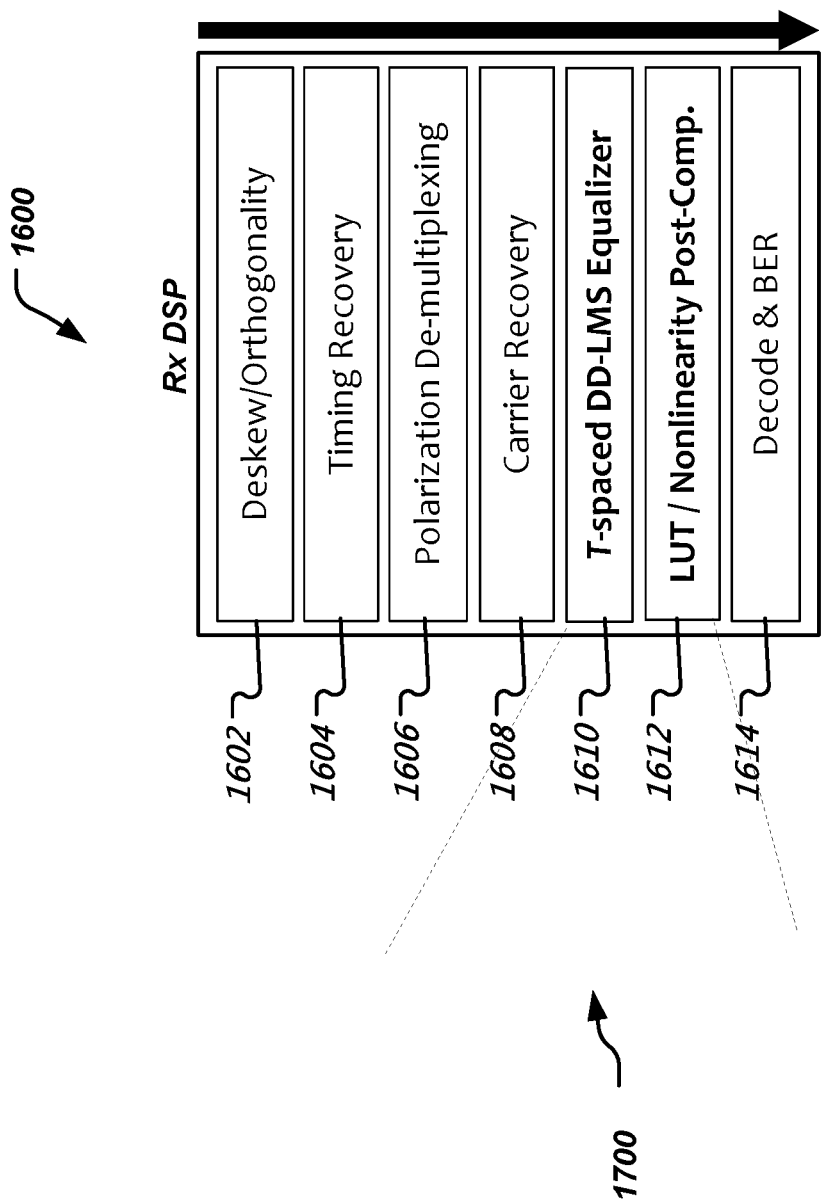
FIG. 16 lists examples of functions performed at the receiver side.
Figure 17:
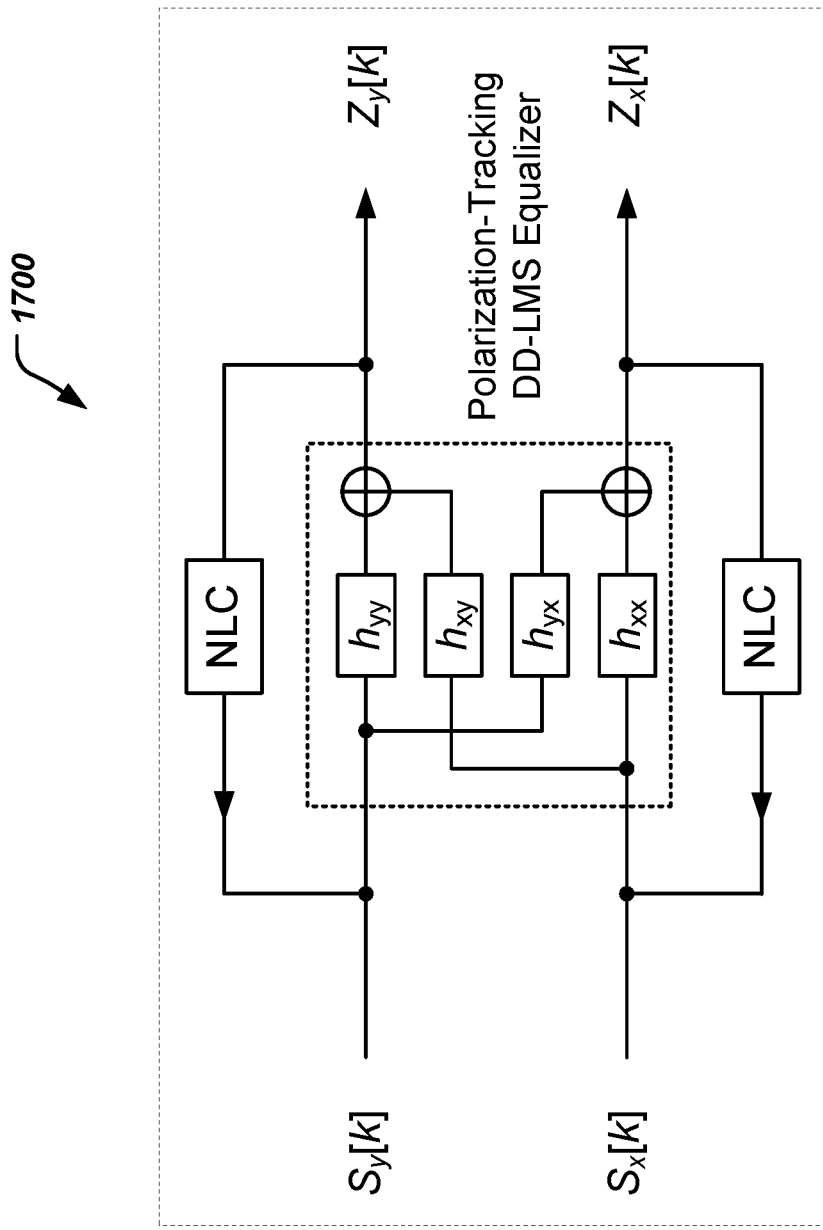
FIG. 17 shows an example of a polarization tracking decision directed least mean square equalizer.

With respect to FIG. 16 and FIG. 17, example embodiments in which receiver-side processing is performed using a DSP for implementing several receiver tasks is disclosed. In various embodiments, these tasks may be implemented in sequence or parallelized when possible. The operations include deskewing 1602, timing recovery 1604, polarization de-multiplexing 1606, carrier recovery 1608, channel estimation using an equalizer, e.g., DD-LMS equalizer 1610, post compensation using LUTs 1612, and decoding the post-compensated symbols 1614 and calculation of bit error rate (BER) for simulation and experimentation. The operations 1610 and 1612 may further include processing 1700 described in FIG. 17.

FIG. 17 shows additional details of an example of iterative nonlinearity post-compensation method can be used in a polarization-multiplexing (PM) system.

In the depicted embodiments, the iterative process of T-spaced DD-LMS equalization and NLC starts after the carrier recovery. The T-spaced DD-LMS equalizer may include four adaptive FIR filters to further match the responses of x-polarization and y-polarization channels, as depicted in FIG. 17. The filters $h_{xy}$ and $h_{yx}$ represent crosstalk between the polarization components, modeled as linear filters, while the filters $h_{xx}$ and $h_{xy}$ represent the equalizer estimation for each component of x and y polarization $S_x$ and $S_y$ to determine the corresponding hard decision values $Z_x$ and $Z_y$.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a receiver in an optical communication network, comprising:
   enabling data communication with a transmitter using a jointly equalized signal using three stages of optimization comprising a pre-equalization stage followed by a pre-distortion stage followed by a joint equalization stage, wherein
   the pre-equalization stage includes:
      receiving, over an optical channel, an optical signal carrying a first training sequence of symbols, wherein the first training sequence is known a priori to the receiver;
      processing the optical signal to estimate an inverse channel response;
      communicating the inverse channel response to a transmitter;
   the pre-distortion stage includes:
      further receiving a second training sequence that is pre-equalized using the inverse channel response;
      generating pre-distortion information from the received second training sequence;
      transmitting the pre-distortion information to the transmitter; and
   the joint equalization stage includes:
      receiving a third training sequence that is pre-equalized using the inverse channel response and pre-distorted using the pre-distortion information;
      selectively updating, based on an improvement of bit error level, the inverse channel response and the pre-distortion information from the received third training sequence; and
      communicating, when updated, the inverse channel response and the pre-distortion information to the transmitter.

2. The method of claim 1, wherein the receiving and the processing operations in the pre-equalization stage are performed iteratively.

3. The method of claim 1, wherein the further receiving and the generating operations in the pre-distortion stage are performed iteratively.

4. The method of claim 1, wherein the receiving the third training sequence and selectively updating operations are performed iteratively.

5. The method of claim 1, wherein a same training sequence is used as the first training sequence, the second training sequence and the third training sequence.

6. An optical communication receiver apparatus, comprising:
   one or more memories holding data and instructions;
   a processor that reads the instructions and implements a receiver-side method of enabling data communication with a transmitter using a jointly equalized signal using three stages of optimization comprising a pre-equalization stage followed by a pre-distortion stage followed by a joint equalization stage; the instructions comprising:
   instructions for executing the pre-equalization stage by:
      receiving, over an optical channel, an optical signal carrying a first training sequence of symbols, wherein the first training sequence is known a priori to the receiver;
      processing the optical signal to estimate an inverse channel response;
      communicating the inverse channel response to a transmitter;
   instructions for executing the pre-distortion stage by:
      further receiving a second training sequence that is pre-equalized using the inverse channel response;
      generating pre-distortion information from the received second training sequence;
      transmitting the pre-distortion information to the transmitter; and
   instructions for executing the joint equalization stage by:
      receiving a third training sequence that is pre-equalized using the inverse channel response and pre-distorted using the pre-distortion information;
      selectively updating, based on an improvement of bit error level, the inverse channel response and the pre-distortion information from the received third training sequence; and
      communicating, when updated, the inverse channel response and the pre-distortion information to the transmitter.

7. The apparatus of claim 6, wherein the instructions for implementing the pre-equalization stage include instructions for iteratively performing the receiving and the processing operations.

8. The apparatus of claim 6, wherein the instructions for implementing the pre-distortion stage include instructions for iteratively performing the receiving the training sequence and the generating operations.

9. The apparatus of claim 6, wherein the instructions for implementing the joint equalization stage include instructions for iteratively performing the receiving the third training sequence and selectively updating operations.

10. The apparatus of claim 6, wherein a same training sequence is used as the first training sequence, the second training sequence and the third training sequence.

11. A method of optical communication, implemented at a transmitter in an optical communication network, comprising:
   enabling data communication with a receiver using a jointly equalized signal using three stages of optimization comprising a pre-equalization stage followed by a pre-distortion stage followed by a joint equalization stage, wherein
   the pre-equalization stage includes:
      transmitting, over an optical channel, an optical signal carrying a first training sequence of symbols;
      receiving an estimate of an inverse channel response;

storing the estimate of the inverse channel response at the transmitter;

the pre-distortion stage includes:

pre-equalizing and transmitting a second training sequence using the estimate of the inverse channel response;

receiving pre-distortion information generated based on the second training sequence; and storing the pre-distortion information at the transmitter; and the joint equalization stage includes:

jointly performing pre-distortion and pre-equalization of a third training sequence using the estimate of the inverse channel response and the pre-distortion information to generate a pre-distorted and pre-equalized third training sequence;

transmitting the pre-distorted and pre-equalized third training sequence over the optical channel; and receiving, based on the pre-distorted and pre-equalized third training sequence, updating information for updating the estimate of the inverse channel response and the pre-distortion information stored at the transmitter.

12. The method of claim 11, wherein the transmitting, the receiving and the storing operations in the pre-equalization stage are performed iteratively.

13. The method of claim 11, wherein the further pre-equalizing, the transmitting, the storing and the receiving operations in the pre-distortion stage are performed iteratively.

14. The method of claim 11, wherein the jointly performing pre-distortion and pre-equalization and the transmitting and the receiving operations of the joint equalization stage are performed iteratively.

15. The method of claim 11, wherein a same training sequence is used as the first training sequence, the second training sequence and the third training sequence.

16. An optical communication transmission apparatus, comprising:

one or more memories holding data and instructions;

a processor that reads the instructions and implements a method of enabling data communication using a jointly equalized signal using three stages of optimization comprising a pre-equalization stage followed by a pre-distortion stage followed by a joint equalization stage; the instructions comprising:

instructions for implementing the pre-equalization stage includes:

transmitting, over an optical channel, an optical signal carrying a first training sequence of symbols;

receiving an estimate of an inverse channel response;

storing the estimate of the inverse channel response at the transmitter;

instructions for implementing the pre-distortion stage by:

pre-equalizing and transmitting a second training sequence using the estimate of the inverse channel response;

receiving pre-distortion information generated based on the second training sequence; and storing the pre-distortion information at the transmitter; and instructions for implementing the joint equalization stage by:

jointly performing pre-distortion and pre-equalization of a third training sequence using the estimate of the inverse channel response and the pre-distortion information to generate a pre-distorted and pre-equalized third training sequence;

transmitting the pre-distorted and pre-equalized third training sequence over the optical channel; and receiving, based on the pre-distorted and pre-equalized third training sequence, updating information for updating the estimate of the inverse channel response and the pre-distortion information stored at the transmitter.

17. The apparatus of claim 16, wherein the instructions for implementing the pre-equalization stage include instructions for iteratively performing the transmitting the receiving and the storing operations of the pre-equalization stage.

18. The apparatus of claim 16, wherein the instructions for implementing the pre-distortion stage include instructions for iteratively performing the pre-equalizing and transmitting, the receiving and the storing operations of the pre-distortion stage.

19. The apparatus of claim 16, wherein the instructions for implementing the joint equalization stage include instructions for iteratively performing the joint pre-distortion and pre-equalization, the transmitting and the receiving operations of the joint equalization stage.

20. The apparatus of claim 16, wherein a same training sequence is used as the first training sequence, the second training sequence and the third training sequence.

21. An optical communication system comprising a transmission apparatus and a receiver apparatus communicatively coupled to each other through an optical communication channel, wherein the transmission apparatus implements a method comprising:

enabling data communication with the receiver apparatus using a jointly equalized signal using three stages of optimization comprising a pre-equalization stage followed by a pre-distortion stage followed by a joint equalization stage, wherein the pre-equalization stage includes:

transmitting, over an optical channel, an optical signal carrying a first training sequence of symbols;

receiving an estimate of an inverse channel response;

storing the estimate of the inverse channel response at the transmitter;

the pre-distortion stage includes:

pre-equalizing and transmitting a second training sequence using the estimate of the inverse channel response;

receiving pre-distortion information generated based on the second training sequence; and storing the pre-distortion information at the transmitter; and the joint equalization stage includes:

jointly performing pre-distortion and pre-equalization of a third training sequence using the estimate of the inverse channel response and the pre-distortion information to generate a pre-distorted and pre-equalized third training sequence;

transmitting the pre-distorted and pre-equalized third training sequence over the optical channel; and receiving, based on the pre-distorted and pre-equalized third training sequence, updating information for updating the estimate of the inverse channel response and the pre-distortion information stored at the transmitter; and the receiver apparatus implements a method comprising:

enabling data communication with the transmitter apparatus using a jointly equalized signal using three stages of optimization comprising a pre-equalization stage followed by a pre-distortion stage followed by a joint equalization stage, wherein the pre-equalization stage includes:

receiving, over an optical channel, an optical signal carrying a first training sequence of symbols, wherein the first training sequence is known a priori to the receiver;

processing the optical signal to estimate an inverse channel response;

communicating the inverse channel response to the transmitter apparatus;

the pre-distortion stage includes:

further receiving a second training sequence that is pre-equalized using the inverse channel response;

generating pre-distortion information from the received second training sequence;

transmitting the pre-distortion information to the transmitter; and the joint equalization stage includes:

receiving a third training sequence that is pre-equalized using the inverse channel response and pre-distorted using the pre-distortion information;

selectively updating, based on an improvement of bit error level, the inverse channel response and the pre-distortion information from the received third training sequence; and communicating, when updated, the inverse channel response and the pre-distortion information to the transmitter apparatus.

22. The optical communication system of claim 21, wherein the transmitting, the receiving and the storing operations implemented at the transmitter apparatus in the pre-equalization stage are performed iteratively.

23. The optical communication system of claim 21, wherein the further pre-equalizing, the transmitting, the storing and the receiving operations implemented at the transmitter apparatus in the pre-distortion stage are performed iteratively.

24. The optical communication system of claim 21, wherein the jointly performing pre-distortion and pre-equalization and the transmitting and the receiving operations implemented at the transmitter in the joint equalization stage are performed iteratively.

25. The optical communication system of claim 21, wherein a same training sequence is used as the first training sequence, the second training sequence and the third training sequence for the transmitter apparatus.

26. The optical communication system of claim 21, wherein the receiving and the processing operations implemented at the receiver apparatus in the pre-equalization stage are performed iteratively.

27. The optical communication system of claim 21, wherein the further receiving and the generating operations implemented at the receiver apparatus in the pre-distortion stage are performed iteratively.

28. The optical communication system of claim 21, wherein the receiving the third training sequence and selectively updating operations implemented at the receiver apparatus in the joint equalization stage are performed iteratively.

29. The optical communication system of claim 21, wherein a same training sequence is used as the first training sequence, the second training sequence and the third training sequence for the receiver apparatus.

* * * * *